(12) United States Patent
Bos et al.

(10) Patent No.: US 8,629,768 B2
(45) Date of Patent: Jan. 14, 2014

(54) VEHICLE VISION SYSTEM

(75) Inventors: Brent J. Bos, Tucson, AZ (US); Kenneth Schofield, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 13/525,767

(22) Filed: Jun. 18, 2012

(65) Prior Publication Data

US 2012/0257060 A1 Oct. 11, 2012

Related U.S. Application Data

(63) Continuation of application No. 13/292,119, filed on Nov. 9, 2011, now Pat. No. 8,203,443, which is a continuation of application No. 11/810,164, filed on Jun. 5, 2007, now Pat. No. 8,063,759, which is a continuation of application No. 10/984,403, filed on Nov. 9, 2004, now Pat. No. 7,227,459, which is a continuation of application No. 10/047,901, filed on Jan. 14, 2002, now Pat. No. 6,822,563, which is a continuation of application No. 09/372,915, filed on Aug. 12, 1999, now Pat. No. 6,396,397.

(51) Int. Cl.
| | |
|---|---|
| *B60Q 1/00* | (2006.01) |
| *B60Q 1/26* | (2006.01) |
| *B60Q 1/12* | (2006.01) |
| *B60Q 1/20* | (2006.01) |
| *G02B 5/124* | (2006.01) |

(52) U.S. Cl.
USPC ............. 340/461; 340/463; 340/468; 315/82; 359/533

(58) Field of Classification Search
None
See application file for complete search history.

(56) References Cited

U.S. PATENT DOCUMENTS

| 2,632,040 A | 3/1953 | Rabinow |
| 2,827,594 A | 3/1958 | Rabinow |

(Continued)

FOREIGN PATENT DOCUMENTS

| DE | 2133182 | 1/1973 |
| DE | 2808260 | 8/1979 |

(Continued)

OTHER PUBLICATIONS

G. Wang, D. Renshaw, P.B. Denyer and M. Lu, CMOS Video Cameras, article, 1991, 4 pages, University of Edinburgh, UK.

(Continued)

*Primary Examiner* — Julie Lieu
(74) *Attorney, Agent, or Firm* — Gardner, Linn, Burkhart & Flory, LLP

(57) ABSTRACT

A vision system for a vehicle includes at least one imaging sensor having a forward field of view with respect to a forward direction of travel of the vehicle. The imaging sensor captures image data representative of objects present in the forward field of view. A control is responsive to the imaging sensor and processes image data captured by the imaging sensor to determine an object present in the forward field of view. The control processes image data to determine a distance between the vehicle and the object determined present in the forward field of view. The control may determine the distance between the vehicle and the determined object at least in part in response to at least one of (i) size of the determined object, (ii) position of the determined object, (iii) light intensity of the determined object, and (iv) rate of approach of the determined object.

32 Claims, 12 Drawing Sheets

(56) References Cited

U.S. PATENT DOCUMENTS

| | | |
|---|---|---|
| 3,141,393 A | 7/1964 | Platt |
| 3,601,614 A | 8/1971 | Platzer |
| 3,612,666 A | 10/1971 | Rabinow |
| 3,665,224 A | 5/1972 | Kelsey |
| 3,680,951 A | 8/1972 | Jordan |
| 3,689,695 A | 9/1972 | Rosenfield et al. |
| 3,708,231 A | 1/1973 | Walters |
| 3,746,430 A | 7/1973 | Brean |
| 3,807,832 A | 4/1974 | Castellion |
| 3,811,046 A | 5/1974 | Levick |
| 3,813,540 A | 5/1974 | Albrecht |
| 3,862,798 A | 1/1975 | Hopkins |
| 3,947,095 A | 3/1976 | Moultrie |
| 3,962,600 A | 6/1976 | Pittman |
| 3,985,424 A | 10/1976 | Steinacher |
| 3,986,022 A | 10/1976 | Hyatt |
| 4,037,134 A | 7/1977 | Löper |
| 4,052,712 A | 10/1977 | Ohama et al. |
| 4,093,364 A | 6/1978 | Miller |
| 4,111,720 A | 9/1978 | Michel et al. |
| 4,161,653 A | 7/1979 | Bedini |
| 4,200,361 A | 4/1980 | Malvano |
| 4,214,266 A | 7/1980 | Myers |
| 4,218,698 A | 8/1980 | Bart et al. |
| 4,236,099 A | 11/1980 | Rosenblum |
| 4,247,870 A | 1/1981 | Gabel et al. |
| 4,249,160 A | 2/1981 | Chilvers |
| 4,266,856 A | 5/1981 | Wainwright |
| 4,277,804 A | 7/1981 | Robison |
| 4,281,898 A | 8/1981 | Ochiai |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama |
| 4,420,238 A | 12/1983 | Felix |
| 4,431,896 A | 2/1984 | Lodetti |
| 4,443,057 A | 4/1984 | Bauer |
| 4,460,831 A | 7/1984 | Oettinger et al. |
| 4,481,450 A | 11/1984 | Watanabe et al. |
| 4,491,390 A | 1/1985 | Tong-Shen |
| 4,512,637 A | 4/1985 | Ballmer |
| 4,529,275 A | 7/1985 | Ballmer |
| 4,529,873 A | 7/1985 | Ballmer |
| 4,546,551 A | 10/1985 | Franks |
| 4,549,208 A | 10/1985 | Kamejima et al. |
| 4,571,082 A | 2/1986 | Downs |
| 4,572,619 A | 2/1986 | Reininger |
| 4,580,875 A | 4/1986 | Bechtel |
| 4,600,913 A | 7/1986 | Caine |
| 4,603,946 A | 8/1986 | Kato |
| 4,614,415 A | 9/1986 | Hyatt |
| 4,620,141 A | 10/1986 | McCumber et al. |
| 4,623,222 A | 11/1986 | Itoh |
| 4,626,850 A | 12/1986 | Chey |
| 4,629,941 A | 12/1986 | Ellis |
| 4,630,109 A | 12/1986 | Barton |
| 4,632,509 A | 12/1986 | Ohmi |
| 4,638,287 A | 1/1987 | Umebayashi et al. |
| 4,647,161 A | 3/1987 | Müller |
| 4,653,316 A | 3/1987 | Fukuhara |
| 4,669,825 A | 6/1987 | Itoh |
| 4,669,826 A | 6/1987 | Itoh |
| 4,671,615 A | 6/1987 | Fukada |
| 4,672,457 A | 6/1987 | Hyatt |
| 4,676,601 A | 6/1987 | Itoh |
| 4,690,508 A | 9/1987 | Jacob |
| 4,692,798 A | 9/1987 | Seko et al. |
| 4,697,883 A | 10/1987 | Suzuki |
| 4,701,022 A | 10/1987 | Jacob |
| 4,713,685 A | 12/1987 | Nishimura et al. |
| 4,717,830 A | 1/1988 | Botts |
| 4,727,290 A | 2/1988 | Smith |
| 4,731,669 A | 3/1988 | Hayashi et al. |
| 4,741,603 A | 5/1988 | Miyagi |
| 4,768,135 A | 8/1988 | Kretschmer et al. |
| 4,772,942 A | 9/1988 | Tuck |
| 4,789,904 A | 12/1988 | Peterson |
| 4,793,690 A | 12/1988 | Gahan |
| 4,817,948 A | 4/1989 | Simonelli |
| 4,820,933 A | 4/1989 | Hong |
| 4,825,232 A | 4/1989 | Howdle |
| 4,838,650 A | 6/1989 | Stewart |
| 4,847,772 A | 7/1989 | Michalopoulos et al. |
| 4,855,822 A | 8/1989 | Narendra et al. |
| 4,859,031 A | 8/1989 | Berman et al. |
| 4,862,037 A | 8/1989 | Farber et al. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,882,565 A | 11/1989 | Gallmeyer |
| 4,886,960 A | 12/1989 | Molyneux |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,900,133 A | 2/1990 | Berman |
| 4,907,870 A | 3/1990 | Brucker |
| 4,910,591 A | 3/1990 | Petrossian et al. |
| 4,916,374 A | 4/1990 | Schierbeek |
| 4,917,477 A | 4/1990 | Bechtel et al. |
| 4,937,796 A | 6/1990 | Tendler |
| 4,953,305 A | 9/1990 | Van Lente et al. |
| 4,956,591 A | 9/1990 | Schierbeek |
| 4,961,625 A | 10/1990 | Wood et al. |
| 4,967,319 A | 10/1990 | Seko |
| 4,970,653 A | 11/1990 | Kenue |
| 4,971,430 A | 11/1990 | Lynas |
| 4,974,078 A | 11/1990 | Tsai |
| 4,987,357 A | 1/1991 | Masaki |
| 4,987,410 A | 1/1991 | Berman et al. |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,050,966 A | 9/1991 | Berman |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,148,014 A | 9/1992 | Lynam |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,214,408 A | 5/1993 | Asayama |
| 5,245,422 A | 9/1993 | Borcherts et al. |
| 5,253,109 A | 10/1993 | O'Farrell |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |

(56) References Cited

U.S. PATENT DOCUMENTS

| | | |
|---|---|---|
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,408,346 A | 4/1995 | Trissel et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,487,116 A | 1/1996 | Nakano et al. |
| 5,493,392 A * | 2/1996 | Blackmon et al. ....... 356/139.03 |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,144 A | 7/1996 | Kise |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,312 A | 9/1996 | Shima et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,668,663 A | 9/1997 | Varaprasad et al. |
| 5,670,935 A | 9/1997 | Schofield et al. |
| 5,675,489 A | 10/1997 | Pomerleau |
| 5,677,851 A | 10/1997 | Kingdon et al. |
| 5,699,044 A | 12/1997 | Van Lente et al. |
| 5,715,093 A | 2/1998 | Schierbeek et al. |
| 5,724,187 A | 3/1998 | Varaprasad et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayer |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,914,815 A | 6/1999 | Bos |
| 5,923,027 A | 7/1999 | Stam et al. |
| 5,929,786 A | 7/1999 | Schofield et al. |
| 5,940,120 A | 8/1999 | Frankhouse et al. |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,964,822 A | 10/1999 | Alland et al. |
| 5,971,552 A | 10/1999 | O'Farrell et al. |
| 5,986,796 A | 11/1999 | Miles |
| 5,990,469 A | 11/1999 | Bechtel et al. |
| 5,990,649 A | 11/1999 | Nagao et al. |
| 6,001,486 A | 12/1999 | Varaprasad et al. |
| 6,009,336 A | 12/1999 | Harris et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,087,953 A | 7/2000 | DeLine et al. |
| 6,097,023 A | 8/2000 | Schofield et al. |
| 6,097,024 A | 8/2000 | Stam et al. |
| 6,116,743 A | 9/2000 | Hoek |
| 6,124,647 A | 9/2000 | Marcus et al. |
| 6,124,886 A | 9/2000 | DeLine et al. |
| 6,139,172 A | 10/2000 | Bos et al. |
| 6,144,022 A | 11/2000 | Tenenbaum et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,198,409 B1 | 3/2001 | Schofield et al. |
| 6,201,642 B1 | 3/2001 | Bos |
| 6,222,447 B1 | 4/2001 | Schofield et al. |
| 6,222,460 B1 | 4/2001 | DeLine et al. |
| 6,243,003 B1 | 6/2001 | DeLine et al. |
| 6,250,148 B1 | 6/2001 | Lynam |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,291,906 B1 | 9/2001 | Marcus et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,313,454 B1 | 11/2001 | Bos et al. |
| 6,317,057 B1 | 11/2001 | Lee |
| 6,320,176 B1 | 11/2001 | Schofield et al. |
| 6,320,282 B1 | 11/2001 | Caldwell |

(56) References Cited

U.S. PATENT DOCUMENTS

| | | |
|---|---|---|
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,353,392 B1 | 3/2002 | Schofield et al. |
| 6,366,213 B2 | 4/2002 | DeLine et al. |
| 6,370,329 B1 | 4/2002 | Teuchert |
| 6,396,397 B1 | 5/2002 | Bos et al. |
| 6,411,204 B1 | 6/2002 | Bloomfield et al. |
| 6,411,328 B1 | 6/2002 | Franke et al. |
| 6,420,975 B1 | 7/2002 | DeLine et al. |
| 6,424,273 B1 | 7/2002 | Gutta et al. |
| 6,428,172 B1 | 8/2002 | Hutzel et al. |
| 6,429,594 B1 | 8/2002 | Stam et al. |
| 6,430,303 B1 | 8/2002 | Naoi et al. |
| 6,433,676 B2 | 8/2002 | DeLine et al. |
| 6,433,817 B1 | 8/2002 | Guerra |
| 6,442,465 B2 | 8/2002 | Breed et al. |
| 6,477,464 B2 | 11/2002 | McCarthy et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek et al. |
| 6,516,664 B2 | 2/2003 | Lynam |
| 6,523,964 B2 | 2/2003 | Schofield et al. |
| 6,534,884 B2 | 3/2003 | Marcus et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,559,435 B2 | 5/2003 | Schofield et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,565 B2 | 7/2003 | Heslin et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,627,918 B2 | 9/2003 | Getz et al. |
| 6,631,994 B2 | 10/2003 | Suzuki et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,728,393 B2 | 4/2004 | Stam et al. |
| 6,735,506 B2 | 5/2004 | Breed et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,847,487 B2 | 1/2005 | Burgner |
| 6,861,809 B2 | 3/2005 | Stam |
| 6,882,287 B2 | 4/2005 | Schofield |
| 6,889,161 B2 | 5/2005 | Winner et al. |
| 6,891,563 B2 | 5/2005 | Schofield et al. |
| 6,909,753 B2 | 6/2005 | Meehan et al. |
| 6,946,978 B2 | 9/2005 | Schofield |
| 6,947,577 B2 | 9/2005 | Stam et al. |
| 6,953,253 B2 | 10/2005 | Schofield et al. |
| 6,968,736 B2 | 11/2005 | Lynam |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,046,448 B2 | 5/2006 | Burgner |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,116,246 B2 | 10/2006 | Winter et al. |
| 7,123,168 B2 | 10/2006 | Schofield |
| 7,133,661 B2 | 11/2006 | Hatae et al. |
| 7,149,613 B2 | 12/2006 | Stam et al. |
| 7,167,796 B2 | 1/2007 | Taylor et al. |
| 7,195,381 B2 | 3/2007 | Lynam et al. |
| 7,202,776 B2 | 4/2007 | Breed |
| 7,224,324 B2 | 5/2007 | Quist et al. |
| 7,227,459 B2 | 6/2007 | Bos et al. |
| 7,227,611 B2 | 6/2007 | Hull et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,339,149 B1 | 3/2008 | Schofield et al. |
| 7,344,261 B2 | 3/2008 | Schofield et al. |
| 7,360,932 B2 | 4/2008 | Uken et al. |
| 7,370,983 B2 | 5/2008 | DeWind et al. |
| 7,375,803 B1 | 5/2008 | Bamji |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,423,248 B2 | 9/2008 | Schofield et al. |
| 7,423,821 B2 | 9/2008 | Bechtel et al. |
| 7,425,076 B2 | 9/2008 | Schofield et al. |
| 7,432,967 B2 | 10/2008 | Bechtel et al. |
| 7,459,664 B2 | 12/2008 | Schofield et al. |
| 7,526,103 B2 | 4/2009 | Schofield et al. |
| 7,541,743 B2 | 6/2009 | Salmeen et al. |
| 7,561,181 B2 | 7/2009 | Schofield et al. |
| 7,565,006 B2 | 7/2009 | Stam et al. |
| 7,616,781 B2 | 11/2009 | Schofield et al. |
| 7,619,508 B2 | 11/2009 | Lynam et al. |
| 7,633,383 B2 | 12/2009 | Dunsmoir et al. |
| 7,639,149 B2 | 12/2009 | Katoh |
| 7,676,087 B2 | 3/2010 | Dhua et al. |
| 7,720,580 B2 | 5/2010 | Higgins-Luthman |
| 7,792,329 B2 | 9/2010 | Schofield et al. |
| 7,843,451 B2 | 11/2010 | Lafon |
| 7,855,778 B2 | 12/2010 | Yung et al. |
| 7,859,565 B2 | 12/2010 | Schofield et al. |
| 7,881,496 B2 | 2/2011 | Camilleri |
| 7,914,187 B2 | 3/2011 | Higgins-Luthman et al. |
| 7,930,160 B1 | 4/2011 | Hosagrahara et al. |
| 7,994,462 B2 | 8/2011 | Schofield et al. |
| 8,017,898 B2 | 9/2011 | Lu et al. |
| 8,063,759 B2 | 11/2011 | Bos et al. |
| 8,095,310 B2 | 1/2012 | Taylor et al. |
| 8,098,142 B2 | 1/2012 | Schofield et al. |
| 8,203,443 B2 | 6/2012 | Bos et al. |
| 8,224,031 B2 | 7/2012 | Saito |
| 2002/0015153 A1 | 2/2002 | Downs |
| 2002/0113873 A1 | 8/2002 | Williams |
| 2003/0137586 A1 | 7/2003 | Lewellen |
| 2003/0222982 A1 | 12/2003 | Hamdan et al. |
| 2004/0051634 A1 | 3/2004 | Schofield et al. |
| 2004/0200948 A1 | 10/2004 | Bos et al. |
| 2005/0073853 A1 | 4/2005 | Stam |
| 2005/0146792 A1 | 7/2005 | Schofield et al. |
| 2005/0200700 A1 | 9/2005 | Schofield et al. |

(56) References Cited

U.S. PATENT DOCUMENTS

| | | |
|---|---|---|
| 2005/0219852 A1 | 10/2005 | Stam et al. |
| 2005/0237385 A1 | 10/2005 | Kosaka et al. |
| 2006/0018511 A1 | 1/2006 | Stam et al. |
| 2006/0018512 A1 | 1/2006 | Stam et al. |
| 2006/0028731 A1 | 2/2006 | Schofield et al. |
| 2006/0050018 A1 | 3/2006 | Hutzel et al. |
| 2006/0091813 A1 | 5/2006 | Stam et al. |
| 2006/0103727 A1 | 5/2006 | Tseng |
| 2006/0250501 A1 | 11/2006 | Wildmann et al. |
| 2007/0023613 A1 | 2/2007 | Schofield et al. |
| 2007/0104476 A1 | 5/2007 | Yasutomi et al. |
| 2007/0109406 A1 | 5/2007 | Schofield et al. |
| 2007/0109651 A1 | 5/2007 | Schofield et al. |
| 2007/0109652 A1 | 5/2007 | Schofield et al. |
| 2007/0109653 A1 | 5/2007 | Schofield et al. |
| 2007/0120657 A1 | 5/2007 | Schofield et al. |
| 2007/0176080 A1 | 8/2007 | Schofield et al. |
| 2007/0242339 A1 | 10/2007 | Bradley |
| 2008/0147321 A1 | 6/2008 | Howard et al. |
| 2008/0192132 A1 | 8/2008 | Bechtel et al. |
| 2009/0113509 A1 | 4/2009 | Tseng et al. |
| 2009/0160987 A1 | 6/2009 | Bechtel et al. |
| 2009/0190015 A1 | 7/2009 | Bechtel et al. |
| 2009/0256938 A1 | 10/2009 | Bechtel et al. |
| 2012/0045112 A1 | 2/2012 | Lundblad et al. |

FOREIGN PATENT DOCUMENTS

| | | |
|---|---|---|
| DE | 2931368 | 2/1981 |
| DE | 2946561 | 5/1981 |
| DE | 3041692 | 5/1981 |
| DE | 3248511 | 7/1984 |
| DE | 3041612 | 8/1986 |
| DE | 4107965 | 9/1991 |
| DE | 4118208 | 11/1991 |
| DE | 4139515 | 6/1992 |
| DE | 4123641 | 1/1993 |
| EP | 48506 | 5/1985 |
| EP | 0202460 | 11/1986 |
| EP | 48810 | 10/1988 |
| EP | 0416222 | 3/1991 |
| EP | 0426503 | 5/1991 |
| EP | 0450553 | 10/1991 |
| EP | 0492591 | 7/1992 |
| EP | 0513476 | 11/1992 |
| EP | 0605045 | 7/1994 |
| EP | 0788947 | 8/1997 |
| EP | 0830267 | 12/2001 |
| FR | 2241085 | 3/1975 |
| FR | 2513198 | 3/1983 |
| FR | 2585991 | 2/1987 |
| FR | 2641237 | 7/1990 |
| FR | 2672857 | 8/1992 |
| FR | 2673499 | 9/1992 |
| FR | 2726144 | 4/1996 |
| GB | 934037 | 8/1963 |
| GB | 1535182 | 12/1978 |
| GB | 2029343 | 3/1980 |
| GB | 2119087 | 11/1983 |
| GB | 2137373 | 10/1984 |
| GB | 2137573 | 10/1984 |
| GB | 2156295 | 10/1985 |
| GB | 2244187 | 11/1991 |
| GB | 2255539 | 11/1992 |
| GB | 2327823 | 2/1999 |
| JP | 55-039843 | 3/1980 |
| JP | 56-30305 | 3/1981 |
| JP | 57-173801 | 10/1982 |
| JP | 57-208530 | 12/1982 |
| JP | 57-208531 | 12/1982 |
| JP | 58-19941 | 2/1983 |
| JP | 58-110334 | 6/1983 |
| JP | 58209635 | 12/1983 |
| JP | 59-51325 | 3/1984 |
| JP | 5951301 | 3/1984 |
| JP | 59114139 | 7/1984 |
| JP | 59133336 | 9/1984 |
| JP | 6079889 | 5/1985 |
| JP | 6080953 | 5/1985 |
| JP | 60-212730 | 10/1985 |
| JP | 60166651 | 11/1985 |
| JP | 60-261275 | 12/1985 |
| JP | 6154942 | 3/1986 |
| JP | 61-56638 | 7/1986 |
| JP | 62-43543 | 2/1987 |
| JP | 6272245 | 5/1987 |
| JP | 62122487 | 6/1987 |
| JP | 62122844 | 6/1987 |
| JP | 62131837 | 6/1987 |
| JP | 6414700 | 1/1989 |
| JP | 01-123587 | 5/1989 |
| JP | 03-061192 | 3/1991 |
| JP | 03-099952 | 4/1991 |
| JP | 042394 | 11/1991 |
| JP | 03-284413 | 12/1991 |
| JP | 417386 | 1/1992 |
| JP | 4114587 | 4/1992 |
| JP | 05-245886 | 9/1992 |
| JP | 05000638 | 1/1993 |
| JP | 05-050883 | 3/1993 |
| JP | 05-077657 | 3/1993 |
| JP | 5213113 | 8/1993 |
| JP | 05213113 | 8/1993 |
| JP | 06-107035 | 4/1994 |
| JP | 6227318 | 8/1994 |
| JP | 06267304 | 9/1994 |
| JP | 06276524 | 9/1994 |
| JP | 06295601 | 10/1994 |
| JP | 074170 | 1/1995 |
| JP | 0732936 | 2/1995 |
| JP | 0747878 | 2/1995 |
| JP | 07052706 | 2/1995 |
| JP | 0769125 | 3/1995 |
| JP | 07-105496 | 4/1995 |
| JP | 07105496 | 4/1995 |
| JP | 08166221 | 6/1996 |
| JP | 02-630604 | 7/1997 |
| JP | 2003-083742 | 3/2003 |
| WO | WO 8605147 | 9/1986 |
| WO | WO 94/27262 | 11/1994 |
| WO | WO 96/21581 | 7/1996 |
| WO | WO 98/14974 | 4/1998 |
| WO | WO 99/14088 | 3/1999 |
| WO | WO 99/23828 | 5/1999 |

OTHER PUBLICATIONS

Dana H. Ballard and Christopher M. Brown, Computer Vision, Prentice-Hall, Englewood Cliffs, New Jersey, 5 pages, 1982.

Kobe, Gerry, "Hypnotic Wizardry! (interior electronics)," *Automotive Industries*, vol. 169, No. 5, p. 60, published May 1989. Relevant section is entitled Instrumentation.

SAE Information Report, "Vision Factors Considerations in Rear View Mirror Design—SAE J985 OCT88," approved Oct. 1988, and located in *1995 SAE Handbook*, vol. 3.

Hamit, Francis, "360-Degree Interactivity: New Video and Still Cameras Provide a Global Roaming Viewpoint", Advanced Imaging, Mar. 1997, p. 50.

Johannes, Laura "A New Microchip Ushers in Cheaper Digital Cameras", The Wall Street Journal, Aug. 21, 1998, p. B1.

Article entitled "Generation of Vision Technology," published by VLSI Vision Limted, publication date unknown.

Article entitled "On-chip CMOS Sensors for VLSI Imaging Systems," published by VLSI Vision Limited, 1991.

Decision—Motions—Bd. R. 125(a), issued Aug. 29, 2006 in connection with Interference No. 105,325, which involved U.S. Appl. No. 09/441,341, filed Nov. 16, 1999, by Schofield et al. and U.S. Patent No. 5,837,994, issued to Stam et al.

Reexamination Control No. 90/007,519, Reexamination of U.S. Patent No. 6,222,447, issued to Schofield et al.

Reexamination Control No. 90/007,520, Reexamination of U.S. Patent No. 5,949,331, issued to Schofield et al.

(56) References Cited

OTHER PUBLICATIONS

Reexamination Control No. 90/011,478, Reexamination of U.S. Patent No. 6,222,447, issued to Schofield et al.
Reexamination Control No. 90/011,477, Reexamination of U.S. Patent No. 5,949,331, issued to Schofield et al.
Search Report from European Patent Application No. EP 96916533.
Tokimaru et al., "CMOS Rear-View TV System with CCD Camera", National Technical Report vol. 34, No. 3, pp. 329-336, Jun. 1988 (Japan).
J. Borenstein et al., "Where am I? Sensors and Method for Mobile Robot Positioning", University of Michigan, Apr. 1996, pp. 2, 125-128.
Bow, Sing T., "Pattern Recognition and Image Preprocessing (Signal Processing and Communications)", CRC Press, Jan. 15, 2002, pp. 557-559.
Vlacic et al., (Eds), "Intelligent Vehicle Tecnologies, Theory and Applications", Society of Automotive Engineers Inc., edited by SAE International, 2001.
Van Leuven et al., "Real-Time Vehicle Tracking in Image Sequences", IEEE, US, vol. 3, May 21, 2001, pp. 2049-2054, XP010547308.
Van Leeuwen et al., "Requirements for Motion Estimation in Image Sequences for Traffic Applications", IEEE, US, vol. 1, May 24, 1999, pp. 145-150, XP010340272.
Van Leeuwen et al., "Motion Estimation with a Mobile Camera for Traffic Applications", IEEE, US, vol. 1, Oct. 3, 2000, pp. 58-63.
Van Leeuwen et al., "Motion Interpretation for In-Car Vision Systems", IEEE, US, vol. 1, Sep. 30, 2002, p. 135-140.
Pratt, "Digital Image Processing, Passage—ED.3", John Wiley & Sons, US, Jan. 1, 2001, pp. 657-659, XP002529771.
Donnelly Panoramic Vision™ on Renault Talisman Concept Car At Frankfort Motor Show, PR Newswire, Frankfort, Germany Sep. 10, 2001.

\* cited by examiner

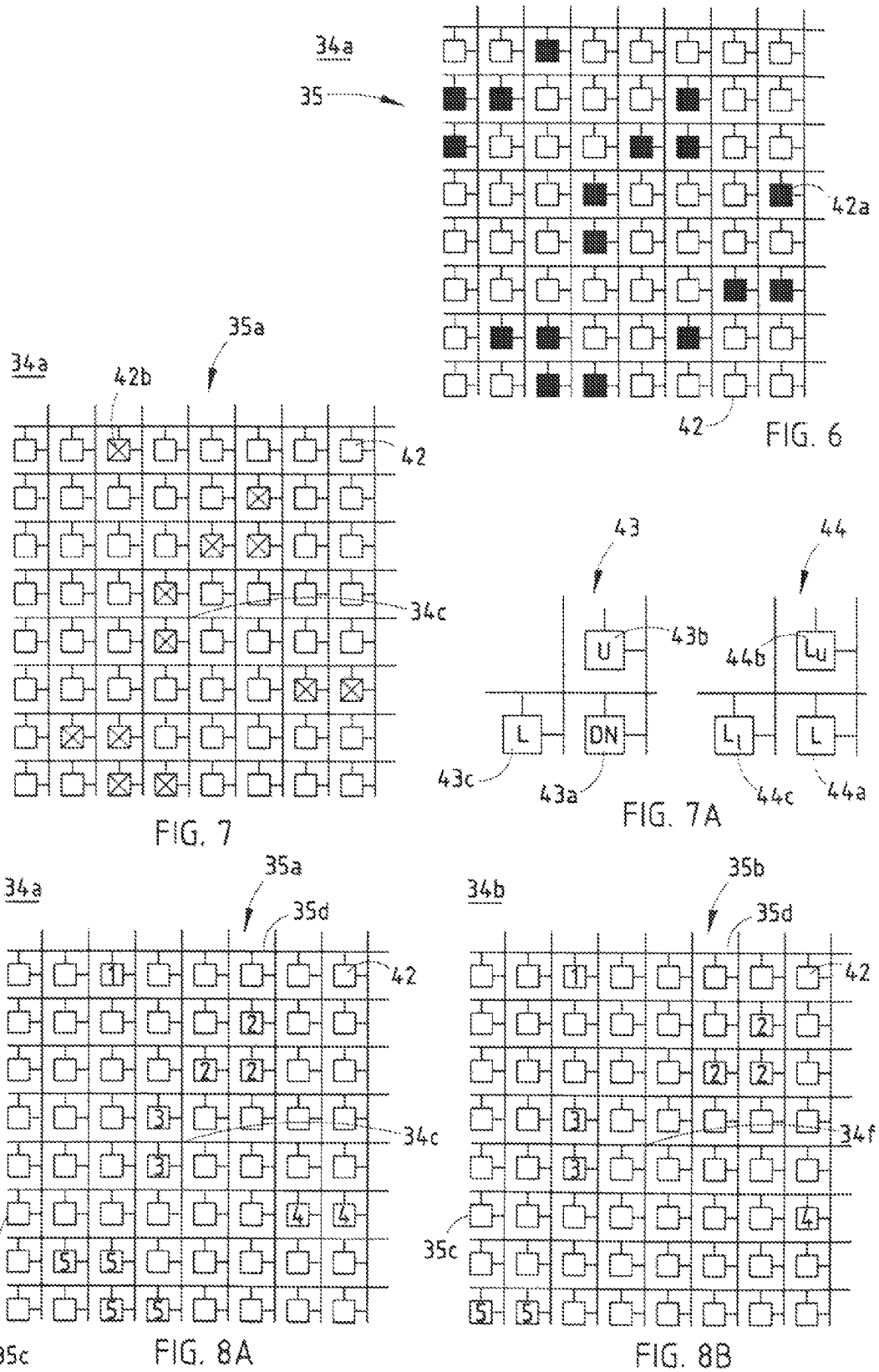

VEHICLE VISION SYSTEM

CROSS REFERENCE TO RELATED APPLICATIONS

The present application is a continuation of U.S. patent application Ser. No. 13/292,119, filed Nov. 9, 2011, now U.S. Pat. No. 8,203,443, which is a continuation of U.S. patent application Ser. No. 11/810,164, filed Jun. 5, 2007, now U.S. Pat. No. 8,063,759, which is a continuation of U.S. patent application Ser. No. 10/984,403, filed Nov. 9, 2004, now U.S. Pat. No. 7,227,459, which is a continuation of U.S. patent application Ser. No. 10/047,901, filed Jan. 14, 2002, now U.S. Pat. No. 6,822,563, which is a continuation of U.S. patent application Ser. No. 09/372,915, filed Aug. 12, 1999, now U.S. Pat. No. 6,396,397.

BACKGROUND OF THE INVENTION

This invention relates generally to vehicular vision systems and, more particularly, to a vehicular vision system which is operable to determine a distance from the vehicle to an object or light source remote from the vehicle. More particularly, the present invention is directed to determining the distance to an object whose image is captured by an image capture device. One application for the imaging system of the present invention is with a vehicle headlamp control and may identify particular light sources of interest and adjust a vehicle's headlamps according to the distance between the vehicle and the particular light sources.

Vehicle camera or vision systems have been proposed for various applications, such as rear and/or side view vision systems, back up aids, collision avoidance systems, rain sensor systems, head lamp control systems and the like. These systems may include a camera or sensor positioned on the vehicle for capturing an image of a scene exteriorly of the vehicle. The vision systems may also include a display for displaying a captured image, or may control an associated accessory on the vehicle, such as windshield wipers, headlamps or even the brake system in response to one or more characteristics of the captured image. In some applications, it has been recognized that distance information between the vehicle and an object in the captured scene may be helpful. In such applications, a ranging device may also be included to provide this information. Various ranging devices have been proposed, such as radar, ultrasonic, sonar, infrared beam/detector devices or similar proximity sensing devices. While such devices provide distance information to the associated vehicular system, this requires an additional sensing device separate from the vehicular vision or camera system, which adds to the bulk and costs associated with the system.

One vehicle system which distance information may be particularly useful is a vehicle headlamp control system for adjusting a vehicle headlamp in response to a detection of oncoming headlamps or leading taillights associated with other vehicles. To date, there have been many proposed headlight dimmer control systems. Many of the prior attempts at vehicle headlight dimming controls include a single light sensor which integrates light from a scene remote from the vehicle. The vehicle headlights are then dimmed when the integrated light exceeds a predetermined threshold. However, these systems typically require a sufficiently low threshold of detection such that many other lower intensity light sources may also be interpreted as headlights or taillights. These systems also have difficulties in reliably detecting taillights of other vehicles traveling ahead of the operative vehicle, since the intensity of taillights is typically substantially less than the intensity of oncoming headlights.

Other proposed headlight dimming controls implement an imaging array sensor which not only senses the light originating from both headlights and taillights, but may further determine the color and intensity of the light, thereby further determining whether the light source is a headlight or a taillight. Such systems are deficient in determining the distance between the sensed light source and the subject vehicle, which would be helpful modulating the headlamps in response to both the sensed light and the distance to the light. One proposed solution is to estimate the distance between the vehicle and the light source in response to the brightness or intensity of the sensed light source, since the detected signal from the light source may at times vary with the square of the distance to the light source. However, such a calculation is only accurate when the sensed light source intensity is within a predetermined level corresponding to a known or assumed intensity of headlamps and is at certain distances. Because the intensity of headlamps and taillamps vary between vehicles and may further vary as the headlamps are modulated between high and low beams and as the brake lights are activated or deactivated, such an estimation of distance may be inaccurate in many cases.

SUMMARY OF THE INVENTION

The present invention provides a vehicular imaging system which is capable of accurately determining the distance from the subject vehicle to an object or light source sensed by the sensors of the imaging system. The distance sensor accurately estimates the distance between the sensed object and the vehicle, while avoiding excessive additional costs and bulk to the vehicle vision and/or control system. In one aspect, the present invention is intended to provide a vehicular headlamp control system which senses oncoming headlights and leading taillights of other vehicles and controls the headlamps of the subject vehicle in response to the sensed light sources and the distance between the vehicle and the sensed light sources. The control system preferably includes ranging capability for determining the distance between the sensed objects and the vehicle. The device preferably is adaptable for use in other vehicular imaging systems associated with the vehicle which may display a distance readout to an operator of the vehicle or may control a vehicle accessory in response to the distance.

According to an aspect of the present invention, a vehicular imaging system comprises at least one imaging array sensor and a control. The imaging sensor is mounted at a vehicle and has stereoscopic distance-sensing capability. The control is responsive to an output of the imaging array sensor in order to capture an image of at least one object external of the vehicle and determine a distance between the imaging array sensor and the object.

Preferably, the imaging array sensor receives a stereoscopic image of a scene remote from the imaging array sensor. The stereoscopic image includes a first image of an object in the scene on a first portion of the imaging array sensor and a second image of the object on a second portion of the imaging array sensor. The control is responsive to the imaging array sensor in order to determine a distance between the imaging array sensor and the object.

In one form, the vehicular imaging system is implemented in a vehicular headlamp control system, such that the headlamps are modulated between high and low beams in response to the distance between the sensed object or light source, which may be representative of an oncoming headlight or leading taillight, and the imaging array sensor.

In another form, the vehicular imaging system includes first and second imaging array sensors such that the first image of the object is received by the first imaging array sensor and the second image of the object is received by the second imaging array sensor. Preferably, a first and second optic element is included along the respective optic paths between the first and second imaging array sensors and the scene. The distance between the object and the sensors may then be determined as a function of a relative position of the image of the object as received on the first and second imaging array sensors and the focal lengths of the first and second optic elements.

According to another aspect of the present invention, a vehicular headlamp control for modulating a headlamp of a vehicle comprises at least one imaging array sensor adaptable to receive a stereoscopic image of a scene remote from the vehicle and a control responsive to the imaging array sensor. The imaging array sensor receives a plurality of images associated with a plurality of light sources associated with the scene. The control identifies light sources of interest and provides a control output to the vehicle. The control calculates a distance between at least one of the light sources and the imaging array sensor and provides the control output in response to the distance. The headlamp control modulates the headlamps of the vehicle in response to the control output.

According to another aspect of the present invention, a rearview vision system for a vehicle comprises at least one imaging array sensor and a control. The imaging array sensor is positioned on the vehicle and is directed outwardly from the vehicle. The imaging array sensor has stereoscopic distance-sensing capability. The control is operable to determine a distance from at least one object exteriorly of the vehicle in response to an output of the imaging array sensor.

These and other objects, advantages, purposes and features of this invention will become apparent upon review of the following specification in conjunction with the drawings.

BRIEF DESCRIPTION OF THE DRAWINGS

FIG. 6 is the same view as FIG. 4, with shading of the pixels indicating pixels sensing an object or light source;

FIG. 7 is the same view as FIG. 6 with similarly illuminated pixels being designated as groups of pixels or segments;

FIG. 7A is a schematic of three-pixel sub-array useful for identifying and labeling the segments illustrated in FIG. 7;

FIGS. 8A and 8B are the same view as FIG. 6 of first and second imaging arrays useful with the present invention, with the similarly illuminated groups of pixels being labeled as discreet groups or segments;

DESCRIPTION OF THE PREFERRED EMBODIMENTS

Figure 1:
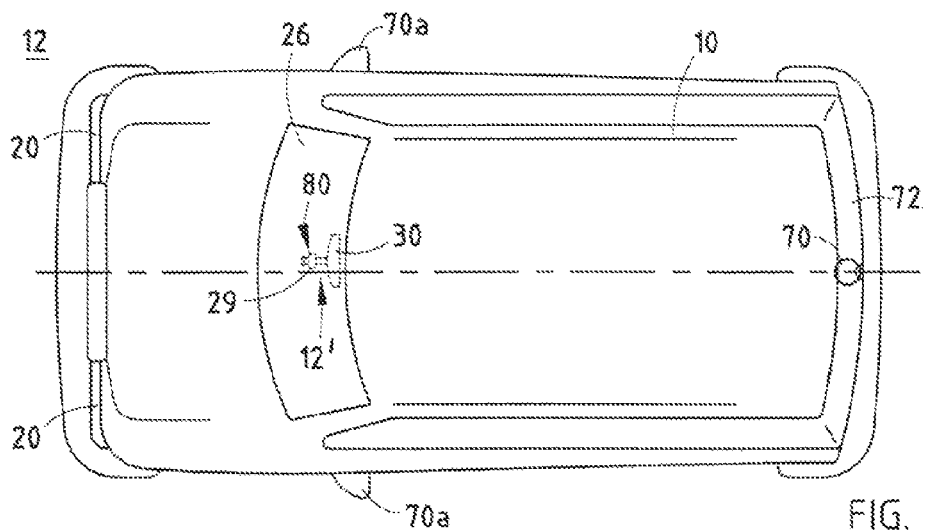
FIG. 1 is a plan view of a vehicle incorporating the present invention.
Figure 2:
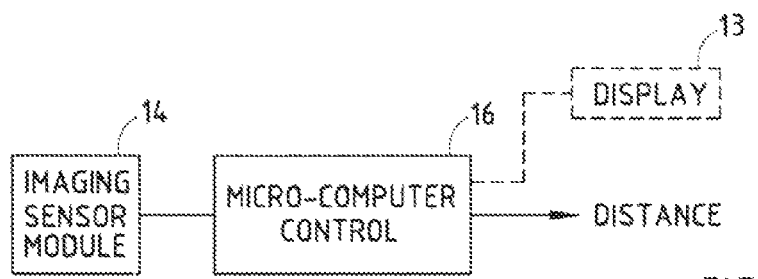
FIG. 2 is a block diagram of the imaging system of the present invention.
Figure 3:
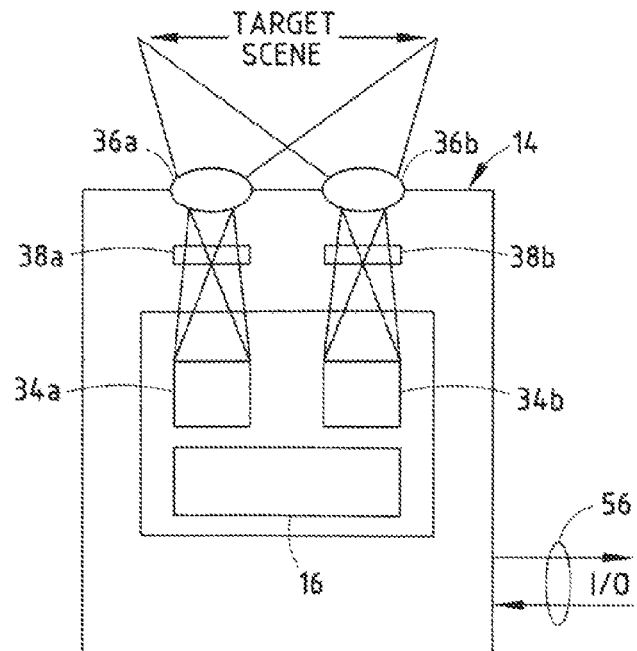
FIG. 3 is a block diagram of an imaging sensor useful with the present invention.

Referring now specifically to the drawings and the illustrative embodiments depicted therein, a vehicle 10 includes a vehicle imaging system 12 which includes an imaging sensor module 14 and an imaging control 16, as shown in FIGS. 1, 2 and 3. Vehicle imaging system 12 may be a rearview vision system of the type disclosed in commonly assigned U.S. Pat. No. 5,670,935, a rearview vision system of the type disclosed in commonly assigned published PCT Application, International Publication No. WO96/38319, published Dec. 5, 1996, a wide angle image capture system of the type disclosed in commonly assigned co-pending U.S. patent application Ser. No, 09/199,907, filed Nov. 25, 1998, now U.S. Pat. No. 6,717, 610, a rain sensor and the like of the type disclosed in commonly assigned published PCT application, International Publication No. WO 99/23828, published May 14, 1999, or a headlamp dimming control of the type disclosed in U.S. Pat. No. 5,796,094, the disclosures of which are hereby incorporated herein by reference. Imaging sensor module 14 senses light from a scene outside of vehicle 10 and imaging control 16 receives an output from sensor module 14. Imaging array module 14 is operable to facilitate determination of a distance between the module 14 and an object, such as a light source, in the target scene by receiving a stereoscopic image of the object on a pair of imaging sensors 34a and 34b or a divided sensor. By comparing the relative locations or registrations of a particular object or light source in the target scene on each of the imaging sensors 34a and 34b, the distance to the object may be determined as discussed below. Vehicle imaging system 12 may include a display 13 or other means for conveying the distance to an operator of vehicle 10 or may respond to the distance determination by controlling an accessory or device such as a warning indicator or signaling device or even the brake system of the vehicle if the control is associated with a collision avoidance system or the windshield wipers and/or headlamps if the control is associated with a rain sensor and/or headlamp control, respectively. If associated with a headlamp control, the distance is used to detect when headlamps or taillamps are at a distance where the headlamps of the controlled vehicle should be dimmed.

As shown in FIG. 1, a backup aid or rear view vision system 70 may be positioned on a rearward portion 72 of vehicle 10 and may comprise a stereoscopic imaging system. Rear view vision system 70 may alternately be positioned on side rearview mirrors 70a or on the rear view mirror 30 within the vehicle. It is further envisioned that the imaging sensors 34a and 34b may be integrally constructed to a housing or fixed portion of the bracket of the exterior mirror, thereby combining the sensors or cameras within the mirror to form a single unit. The stereoscopic vision system may then determine the distance from the vehicle to an object rearward of the vehicle and provide a distance output to an operator of vehicle 10. The vision system may include a display 13 which provides an operator of the vehicle with an image of the scene remote from the vehicle and a distance readout to an object or objects in the scene.

Preferably, the image may be displayed as a unitary image synthesized from outputs of two or more imaging sensors. Image enhancements may also be provided in the displayed image to further enhance the driver's understanding of the area immediately surrounding vehicle 10. For example, graphic overlays, such as distance indicia in the form of horizontal grid markings or the like, may be provided to indicate distances between the vehicle and objects displayed in display 13. These graphic overlays may be superimposed on display 13 and thus are visible to the operator of vehicle 10. The grid markings may be moved, curved or otherwise adjusted in response to a change in the vehicle's direction of travel, which may be determined by a change in the vehicle's steering system, the vehicle's differential system or a compass heading. Additionally, images of objects or other vehicles may be adjusted or enhanced in response to the distance between vehicle 10 and the other vehicles, such as by flashing or changing the color of images of objects within a threshold distance of vehicle 10. Alternatively, the distance to multiple objects or a distance to a closest object may be displayed on display 13 or otherwise communicated to the vehicle operator. The distance to several objects may be displayed or the operator may select one or more particular objects in the display for which the distance is determined. The selection may be made by a mouse, keypad, joystick or the like.

Alternately, the stereoscopic vision system may be implemented with a rain sensor 80, which may be placed inside the vehicle passenger compartment and directed toward a window or windshield 26. Rain sensor 80 may then be operable to determine a distance from the sensor to the sensed droplets, in order to ensure that the sensed droplets are positioned on the windshield 26 of vehicle 10 and not remotely positioned therefrom, thereby reducing the possibility of a false detection of rain on the windshield.

Figure 14:
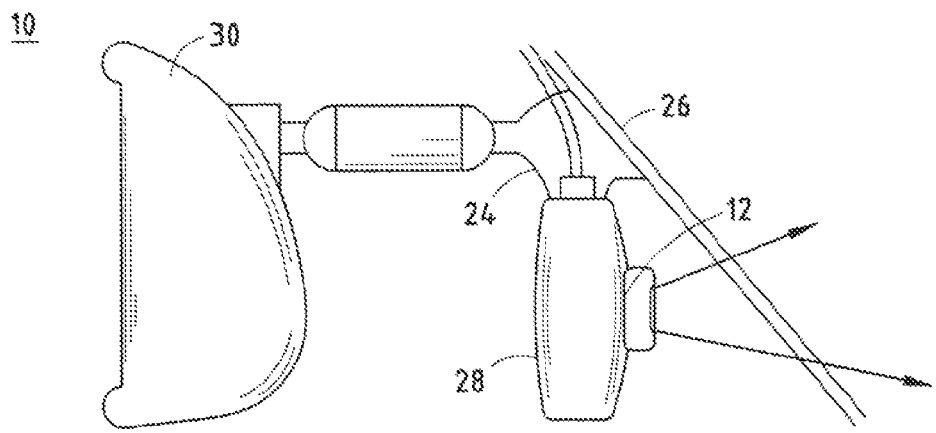
FIG. 14 is a side elevation of a portion of a vehicle embodying a headlamp dimmer control in accordance with the present invention.

As mentioned above, the stereoscopic imaging system is also useful with a vehicle headlamp dimming control 12'. The headlamp control 12' may be implemented in a rearview mirror assembly 30 and directed forwardly of vehicle 10 (FIG. 14). Headlamp control 12' may then adjust or modulate the headlamps 20 of vehicle 10 in response to a distance between the vehicle and oncoming headlamps or leading taillights of other vehicles. This substantially reduces the possibility of modulating the headlamps when the detected vehicle is substantially distant from vehicle 10.

Figure 15:
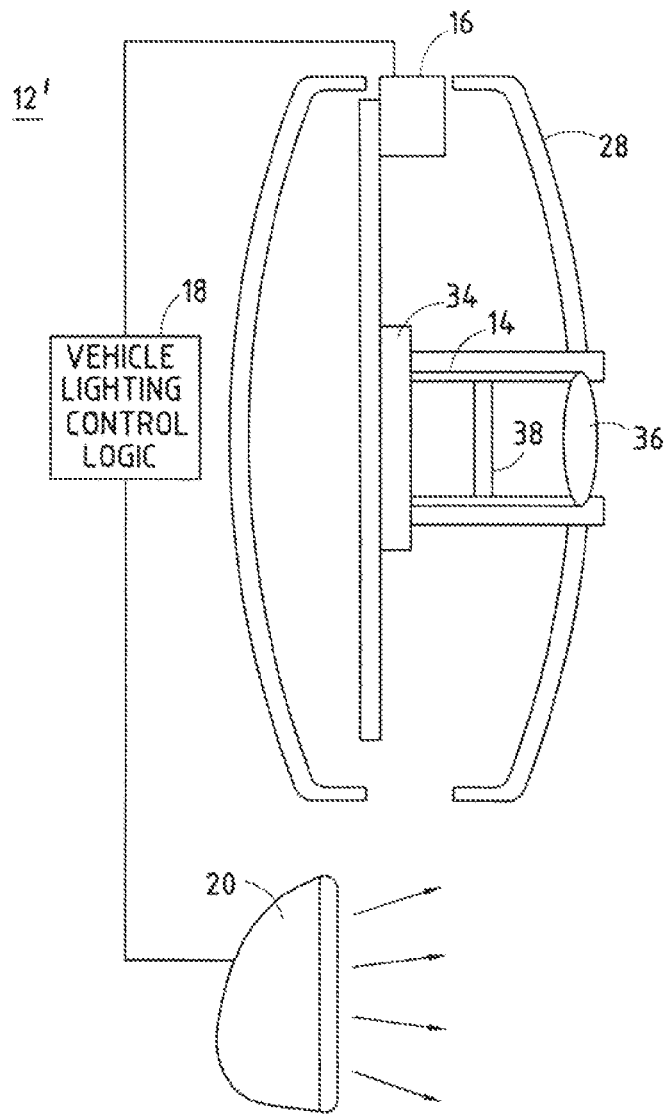
FIG. 15 is a partial side elevation view and block diagram of the vehicle headlight dimming control of FIG. 14.

Referring now to FIG. 3, imaging sensor module 14 preferably includes a pair of imaging array sensors 34a and 34b, each of which receives an image of the target scene via a pair of focusing lenses 36a and 36b and a pair of color filters 38a and 38b, respectively, all of which are positionable along respective optic paths between the target scene and imaging array sensors 34a and 34b. Control 16 receives an output from each imaging array sensor 34a and 34b and converts the output to digital values via an analog to digital converter (not shown) and communicates the values to an appropriate control logic, such as a vehicle lighting control logic module 18 (FIG. 15). Control 16 further functions to at least occasionally activate each imaging array sensor 34a and 34b and analyze the output of each to determine the type of light source sensed and a distance from the vehicle to the light source.

Figure 4:
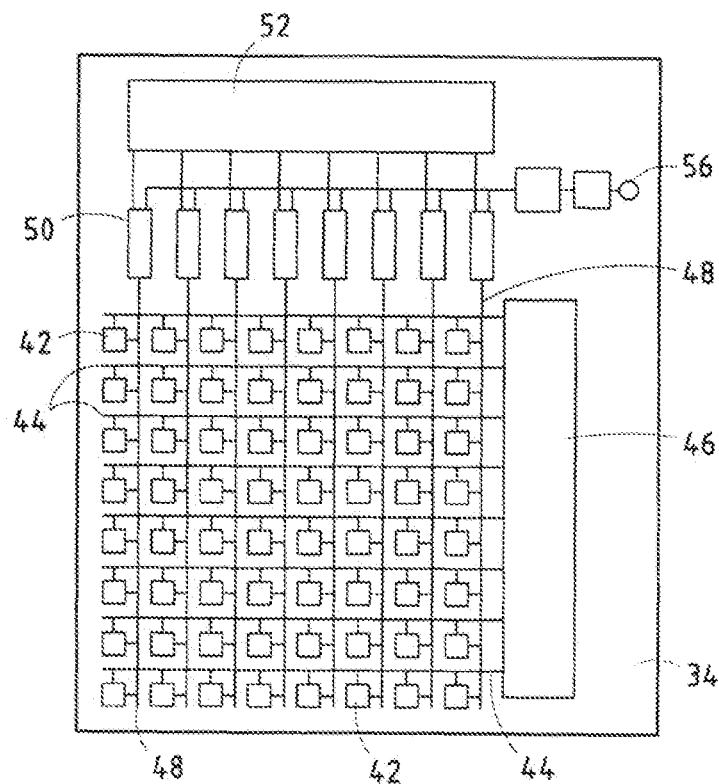
FIG. 4 is a schematic diagram of a light-sensing array useful with the present invention.

Preferably, imaging arrays 34a and 34b are pixelated imaging array sensors, such as a CCD or a CMOS sensor, although other array sensors may be implemented without affecting the scope of the present invention. As shown in FIG. 4, each of the imaging array sensors 34a and 34b are preferably similar to the type disclosed in commonly assigned U.S. Pat. No. 5,550,677 issued to Kenneth Schofield and Mark Larson, the disclosure of which is hereby incorporated herein by reference. Because the imaging array sensors are described in detail in the Schofield '677 patent, the specific details will not be further discussed herein. Briefly, each of the imaging array sensors 34a and 34b preferably comprise a plurality of photon accumulating light sensors or pixels 42. The array of photosensors 42 are interconnected to a vertical shift register 46 and a horizontal shift register 52 via a common word line 44 and a common bit line 48, respectively. The bit lines 48 are also interconnected with amplifiers 50. The registers 46 and 52 function to individually access each photo-sensor pixel or element 42 and provide an output 56 associated with the individual signals to the analog to digital converter of control 16.

Figure 5:
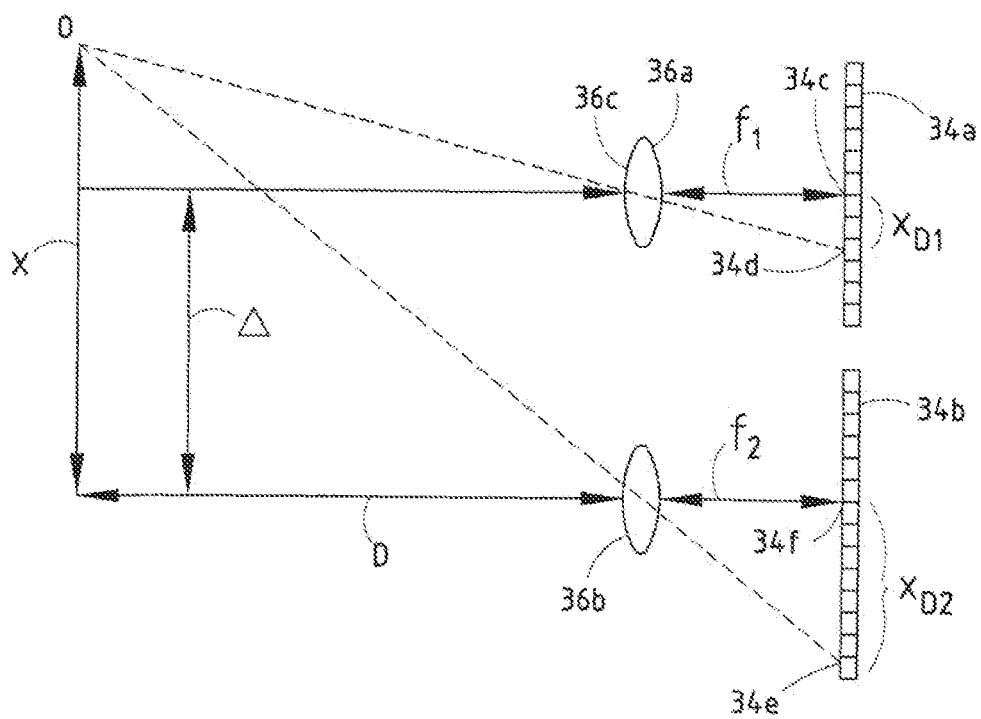
FIG. 5 is the same view as FIG. 3 illustrating the geometric relationship between an object and the imaging sensor useful with the present invention.

As imaging array sensors 34a and 34b receive light from objects and/or light sources in the target scene, control 16 may then be operable to determine a color or other characteristic, such as intensity or size, being communicated by the sensed light sources, which may further be determined to be a desired target object, such as a headlamp or taillight, as disclosed in the Schofield '094 patent. Color filters 38a and 38b may also be used to determine the color of other light sources as well. The color filters may be conventional mosaic filters or the like or may be electro-optic filters of the type disclosed in commonly assigned and co-pending U.S. provisional patent application Ser. No. 60/135,657, filed on May 24, 1999, the disclosure of which is hereby incorporated herein by reference. By receiving a stereoscopic image on sensors 34 such that one image is received on one array 34a while a corresponding image is received on the second array 34b, the distance to an object in the target scene may then be determined as a function of the locations of each sensed image relative to a respective reference location, such as a center point or axis, of the corresponding imaging array sensors, the separation distance of the two arrays and the focal length of the focusing lenses or optics. This distance may be calculated according to the following equation:

$$D = \frac{\Delta f_1 f_2}{f_1 x_{D2} - f_2 x_{D1}}; \tag{1}$$

where, as represented in FIG. 4, D is the straight-line distance from the sensed object to a forward surface 36c of optics 36a and 36b, A is the lateral separation distance between a midpoint, axis or other reference point associated with each sensor 34a and 34b, $f_1$ is a focal length of the first optic 36a, $f_2$ is a focal length of the second optic 36b, $x_{D1}$ is a directed distance from a center axis 34c of the first sensor 34a to the sensed image 34d of the object O on sensor 34a and $x_{D2}$ is a corresponding directed distance from a center axis 34f of the second sensor 34b to the sensed image 34e of the object O on sensor 34b. The directed distances $x_{D1}$ and $x_{D2}$ may be positive or negative values in accordance with the location where the sensed images 34*d* and 34*e* are detected by sensors 34*a* and 34*b*, respectively. For example, $x_{D1}$ and $x_{D2}$ may both be positive in FIG. 5, but one or both may be a negative value if the object O is positioned relative to the optics and sensors such that one or both sensed images 34*d* and 34*e* are received by sensors 34*a* and 34*b* on the other side of the center axes 34*c* and 34*f*, respectively.

Once the distance D is known, the lateral distance X to the object O may also be determined by the equation:

$$X = \frac{D x_{D2}}{f_2}, \tag{2}$$

Similarly, the angle from the vehicle to the object O may easily be calculated by taking the inverse tangent of the lateral distance X divided by the longitudinal distance D or of the image position $x_{D2}$ divided by the focal length $f_2$. Control 16 may then determine if the sensed object or light source is within a predetermined tolerance band of a targeted object or light source, such as a typical headlamp or taillight, both in intensity and in location (lateral and longitudinal distance) relative to vehicle 10. If the intensity and distance of the signal is within the tolerance or threshold levels, the signal may be determined to be one of the targeted objects and imaging system 12 may respond accordingly. For example, if imaging system 12 is associated with a vehicle headlamp control, imaging system 12 may adjust the headlamps 20 of vehicle 10 in response to a distance and angle between vehicle 10 and the detected headlamps and/or taillights of other vehicles.

Referring now to FIGS. 6 through 8, the following illustrates and describes the processes through which control 16 may determine the distance between a light source or other sensed object and the vehicle 10. As shown in FIG. 6, the arrays 35*a* and 35*b* of the respective imaging array sensors 34*a* and 34*b* include pixels 42, which sense light values representative of light sources and other objects present in the target scene. Although shown as an array comprising an 8×8 array of pixels, the array is shown here as a small array for purposes of clarity only, since typical imaging array sensors useful with the present invention may comprise approximately 512×512 pixel arrays or more. The pixels 42 are shown with shaded pixels 42*a* representing sensed light values which are greater than a pre-determined noise level associated with the array sensors 34*a* and 34*b*.

When operable, control 16 may shutter or open each of the imaging array sensors 34*a* and 34*b* to collect the signals from the target scene on each array 35*a* and 35*b*. After the signal has been received and communicated to control 16, control 16 may function to identify and classify each of the pixels in accordance with their intensity and color as determined by control 16 and pixel assignment with respect to color filters 38*a* and 38*b*. For example, white pixels may be identified and analyzed to determine whether the white pixels are headlamps of oncoming vehicles, and then red pixels may be identified and analyzed to determine whether the red pixels are tail lights of the leading vehicles traveling in the same direction ahead of the subject vehicle 10. Clearly, however, the pixels may be classified and analyzed according to other colors or intensities for determining the distance to other objects or light sources within the targeted scene, without affecting the scope of the present invention.

As shown in FIG. 7, similarly illuminated pixels, having a similar color and/or intensity, are similarly classified, such as red or white, and are shown as pixels 42*b* with an "x" through them. Not all of the shaded pixels 42*a* in FIG. 6 are similarly classified in FIG. 7 because some of the shaded pixels 42*a* may represent a light value above the noise threshold but from a different colored light source. The similarly classified pixels 42*b* may then be assigned a value of one or otherwise labeled, while the other blank pixels 42 may be assigned a value of zero, for the purpose of determining connected segments or groups of pixels corresponding to each particular light source in the target scene. This is preferably accomplished by activating a segmentation and labeling algorithm or process 100 which determines which of the classified pixels 42*b* belongs to each particular segment or light source and labels each segment in numeric order. Each segment of pixels within a particular classification, such as white, red or other color, is thus labeled as a discreet segment from the other pixels or segments of pixels with the same classification. Labeling algorithm 100 preferably analyzes each pixel and compares the assigned value (such as one or zero) of each pixel to one or more neighboring pixels. A set of neighboring pixels is represented by a three-pixel window or sub-array 43 (FIG. 7A) which may be applied to each of the imaging arrays 35*a* and 35*b*. The sub-array 43 is preferably moved through the array, starting at an upper left corner and proceeding left to right and then downward until each pixel in the array has been analyzed and compared to its neighboring pixels.

As sub-array 43 moves through arrays 35, each pixel 42 and 42*b* is individually analyzed by a leading pixel window 43*a* to determine if the individual pixel has been assigned a value of one. If the pixel is assigned as one, each of the neighboring upper and left pixels are also analyzed by an upper and left pixel window 43*b* and 43*c*, respectively, in order to determine if an individual pixel that is assigned a value of one is connected with one or more previously analyzed pixels similarly assigned a value of one. A labeling window or sub-array 44 then further analyzes the individual pixel with a labeling pixel window 44*a* and the upper and left adjacent pixels with labeling pixel windows 44*b* and 44*c*, respectively. Labeling sub-array 44 determines and compares the designated segment number for each of the previously analyzed neighboring or adjacent pixels and labels the subject individual pixel accordingly. For example, if either the upper or left pixel were also assigned a value of one, then that particular pixel would already be labeled as a segment by labeling sub-array 44. Accordingly, labeling sub-array 44 would label the subject pixel with the same segment number as already applied to its neighboring pixel. If the upper and left pixels are labeled differently, the left pixel would then be re-labeled to match the upper, or first labeled, pixel. Pixels within a connected segment are thus labeled in accordance with that particular segment number by labeling sub-array 44. This process is continued for each pixel in array 35. Clearly, however, other processes for analyzing and labeling neighboring pixels may be performed without affecting the scope of the present invention. Furthermore, although labeling algorithm 100 is described as analyzing and labeling segments which include only pixels which have adjacent or connected sides, other algorithms may be implemented which label segments which have pixels adjacent at their corners or within a predetermined range and/or intensity of each other.

After the three pixel windows 43 and 44 have completed analyzing and labeling each of the pixels 42 within the imaging arrays, each of the discreet segments are grouped together and labeled numerically, as shown in FIGS. 8A and 8B for imaging array sensors 34*a* and 34*b*, respectively. The average pixel location and maximum intensity of each segment may then be determined in order to facilitate a comparison of the segments on their respective sensors. This is accomplished by summing the x and y pixel coordinates for the pixels within each segment and dividing each sum by the number of pixels within the segment. For example, segment number (2) in FIG. 8A would have an average x position of $$5.67 \left( \frac{5+6+6}{3} \right)$$

from a left edge 35*c* of array 35*a* and an average y position of $$2.67 \left( \frac{2+3+3}{3} \right)$$

from an upper edge 35*d* of array 35*a*. Because the two imaging sensors 34*a* and 34*b* are separated by a predetermined distance, each of the particular segments representing a particular light source may be positioned differently on imaging array sensor 34*b* as compared to a corresponding segment on the other imaging array sensor 34*a*, depending on the distance and lateral orientation between the sensors and the light source in the targeted scene. This is represented in FIG. 8B, where segment number (2) is received by sensor 34*b* such that it has an average x position of $$6.67 \left( \frac{6+7+7}{3} \right)$$

and the same average y position as the segment had on the sensor 34*a* in FIG. 8A. The distance may then be calculated using equation (1) above, where $x_{D1}$ and $x_{D2}$ are the directed distances from a reference point or center axis 34*c* and 34*f* of each sensor 34*a* and 34*b* to the average position of the particular segment on each sensor. In this example, $x_{D1}$ may be a distance corresponding to separation of 1.67 pixels while $x_{D2}$ may be a distance corresponding to a separation of 2.67 pixels, with the center axes 34*c* and 34*f* being at the center of the depicted arrays. Vehicle imaging system 12 may then determine if the intensity and location of the segments are consistent with the relevant or targeted images or light sources, such as headlamps or taillights, and may display an image or readout or adjust an associated accessory of vehicle 10 accordingly.

Although described as preferably utilizing segmentation and averaging algorithms, the present invention may alternatively compare individual pixels on one array to similarly illuminated individual pixels on the other array. Because the preferred embodiment groups similarly classified and positioned pixels together into segments and determines a maximum intensity and average location of the segment, the preferred system provides improved accuracy for distance calculation over a comparison of individual pixels. This is because the measurement resolution is then not limited to a pixel separation distance, since the average or center location of the sensed light source may be somewhere between two or more pixels. Accordingly, the preferred control of the present invention provides sub-pixel resolution in the distance calculation.

Figure 9:
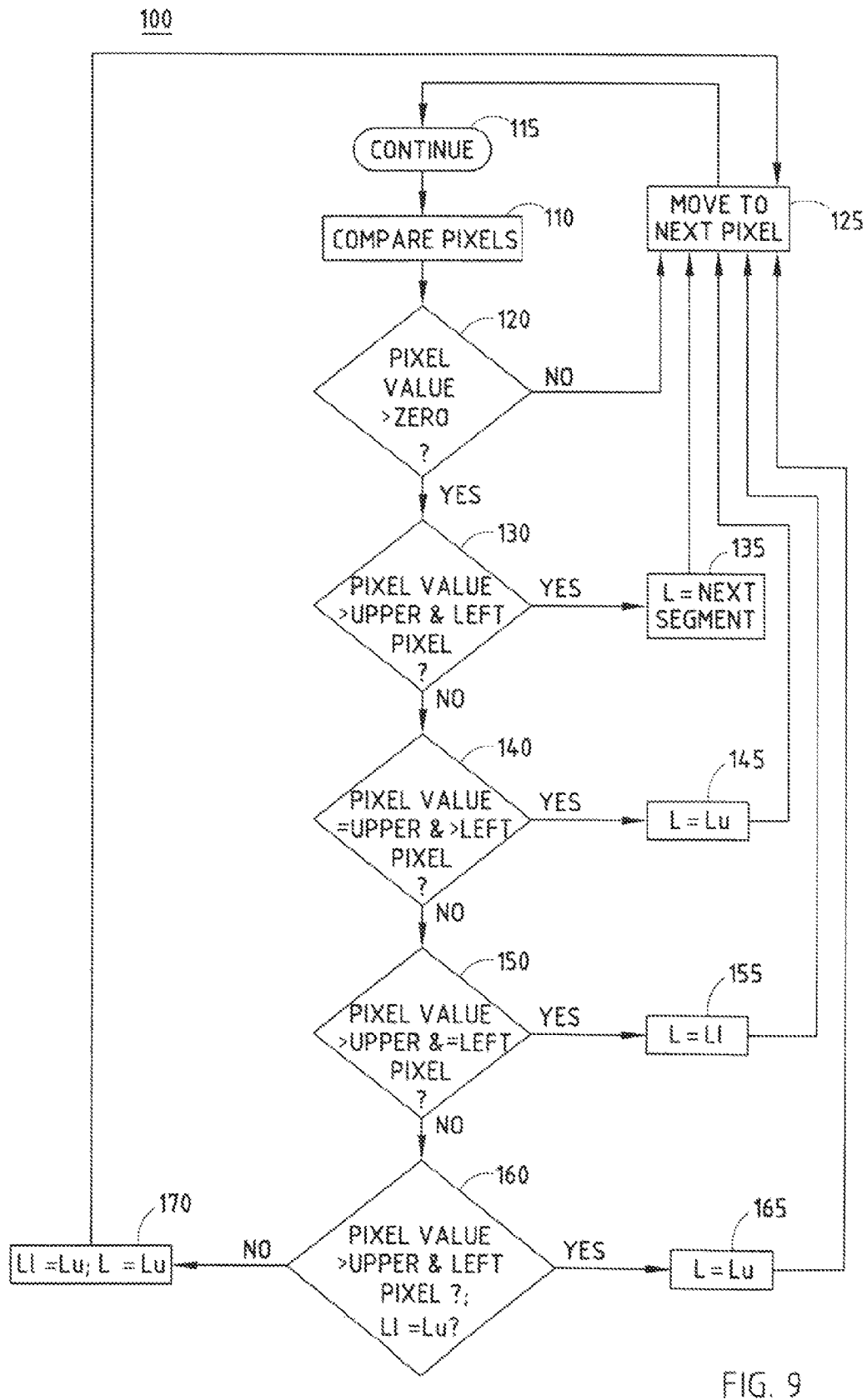
FIG. 9 is a flow-chart of a segment labeling process useful with the present invention.

Referring now to FIG. 9, labeling algorithm or process 100 determines and labels the segments of similarly classified pixels on each imaging array sensor. Process 100 starts at 110 and compares each individual pixel to at least two neighboring pixels. If it is determined at 120 that the target pixel has not been assigned a value of one, or is not above a threshold value, then process 100 moves to the next pixel at 125 and continues at 115. If it is determined at 120 that the target pixel value is greater than the threshold value or, in other words, has been assigned a value of one, then it is further determined at 130 whether the pixel value is greater than the values associated with both an upper adjacent pixel and left adjacent pixel. If it is determined at 130 that the pixel value is greater than both of the upper and left pixels, then that particular pixel is assigned a new segment number at 135 and process 100 moves to the next pixel at 125 and continues at 115. If it is determined at 130 that the pixel value is not greater than both the upper and left pixel, then it is further determined at 140 whether the pixel value is equal to the upper pixel and not equal to the left value. If the pixel value is equal to the upper pixel and is not equal to or is greater than the left pixel, then the particular pixel is assigned the same segment number as the upper pixel at 145 and the process 100 moves to the next pixel at 125 and continues at 115.

If it is determined at 140 that the pixel value is not equal to the upper pixel or is equal to the left pixel, then it is further determined at 150 whether the pixel value is both equal to the left pixel and is not equal to or is greater than the upper pixel. If it is determined at 150 that the pixel value is equal to the left pixel and is not equal to the upper pixel, then the particular pixel is assigned the same segment number as the left pixel at 155, and process 100 moves to the next pixel at 125 and continues at 115. If it is determined at 150 that the pixel value is not equal to the left pixel value or is equal to the upper pixel value, then it is further determined at 160 whether the pixel value is equal to both the left and upper pixels and the left and upper pixels are labeled the same. If it is determined at 160 that the pixel value is equal to the left and upper assigned values and the left and upper pixels are labeled the same, then the particular pixel is labeled the same as the upper pixel at 165. Process 100 then moves to the next pixel at 125 and continues at 115. If, however, the left label is not equal to the upper label at 160, then the particular pixel is labeled the same as the upper pixel and the left pixel is correspondingly relabeled to the same as the upper pixel at 170, since the target pixel now joins the left and upper pixel within the same segment. Process 100 then moves to the next pixel to 125 and continues at 115 until each pixel within each imaging array sensor has been analyzed and labeled accordingly. Process 100 may be performed one or more times on each of the pixelated imaging array sensors in order to provide optimal results.

Figure 10:
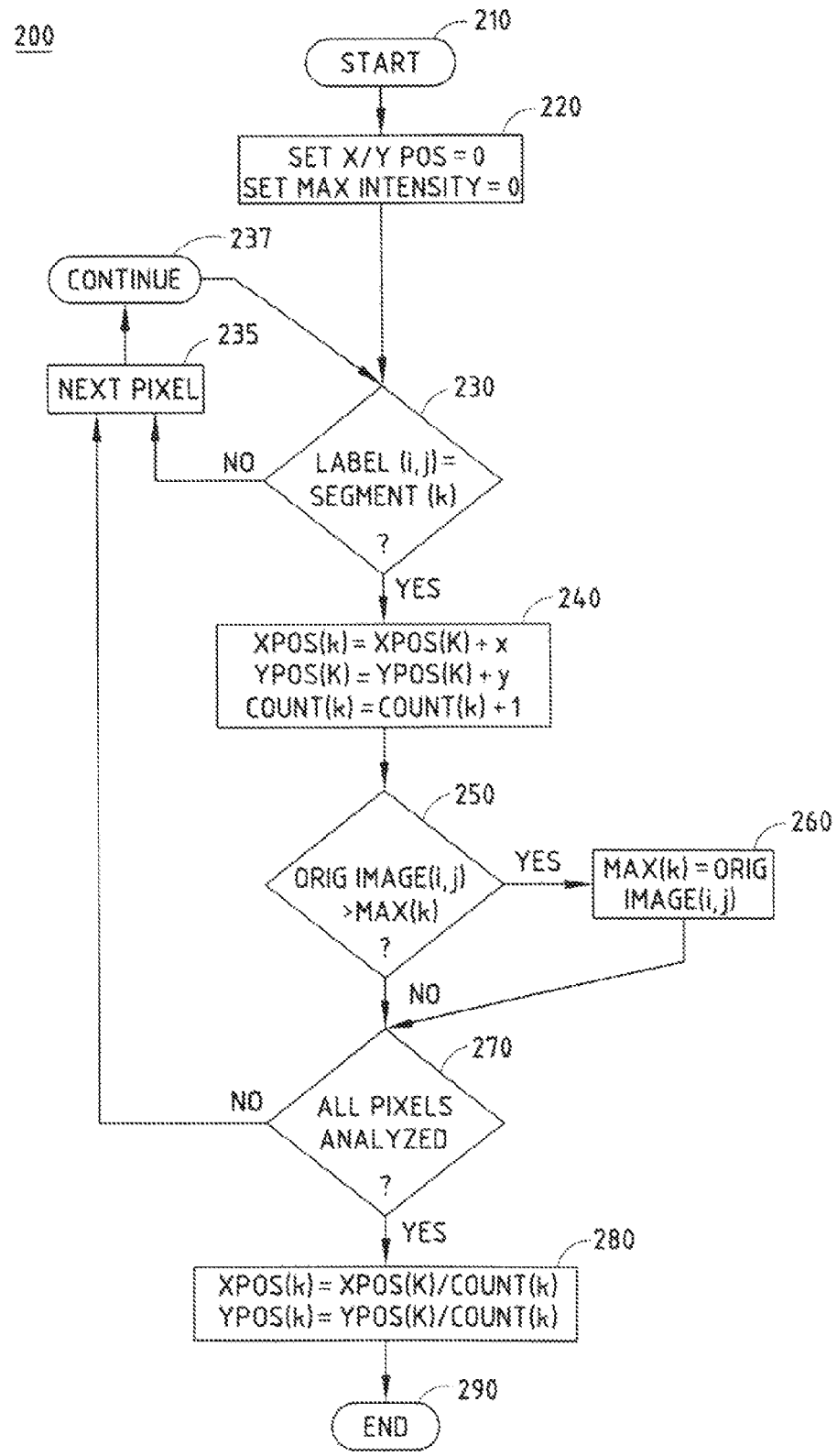
FIG. 10 is a flow-chart of a process for determining the position and intensity of the segments.

After labeling process 100 has been performed on each of the pixelated imaging array sensors 34*a* and 34*b*, the pixels are labeled according to the segments or groups of pixels associated with particularly classified light sources. Once each particular segment is labeled on each sensor, additional algorithms or processes may be performed by control 16, in order to determine a location and intensity of each segment with respect to the particular sensor. As shown in FIG. 10, a position and intensity process 200 determines an average x and y position of each segment relative to its respective sensor and a maximum intensity associated with each segment. Process 200 analyzes each pixel in each array and starts at 210. Process 200 sets each position and intensity value for each segment to zero at 220. If it is determined at 230 that the label for the pixel being analyzed is not equal to one of the previously designated segment numbers, then process 200 moves to the next pixel at 235 and continues at 237. If, on the other hand, the label associated with the particular pixel is equal to one of the segment numbers, then the x position and y position values for that segment are summed at 240. The x position value for the particular segment is the sum of the previously calculated x position value for that segment plus the x ordinate for the particular pixel relative to the sensor array. The y position value for that segment is similarly calculated and a counter value is increased by one at 240.

It is then determined at 250 whether an image intensity value for that pixel is greater than the maximum intensity value associated with that particular segment. If the pixel intensity value is greater than the maximum intensity for that segment, then the maximum intensity value for that segment is set to the sensed image intensity value for the particular pixel at 260. It is then determined at 270 whether all the pixels on each array have been analyzed. If it is determined at 270 that not all the pixels have been analyzed, then process 200 moves to the next pixel at 235 and continues at 237. If it is determined at 270 that the pixels have all been analyzed, then an average x position and y position associated with each segment is then calculated at 280 by dividing the summed x and y position values for each segment by the corresponding count value for each particular segment. The process ends at 290. Upon completion of process 200, an average x and y position and a maximum intensity associated with each segment is stored for comparison with the positions and intensities sensed by the other array sensor. The positional values may be converted to conventional units of measurement for use in the distance calculations of equation (1).

Figure 11:
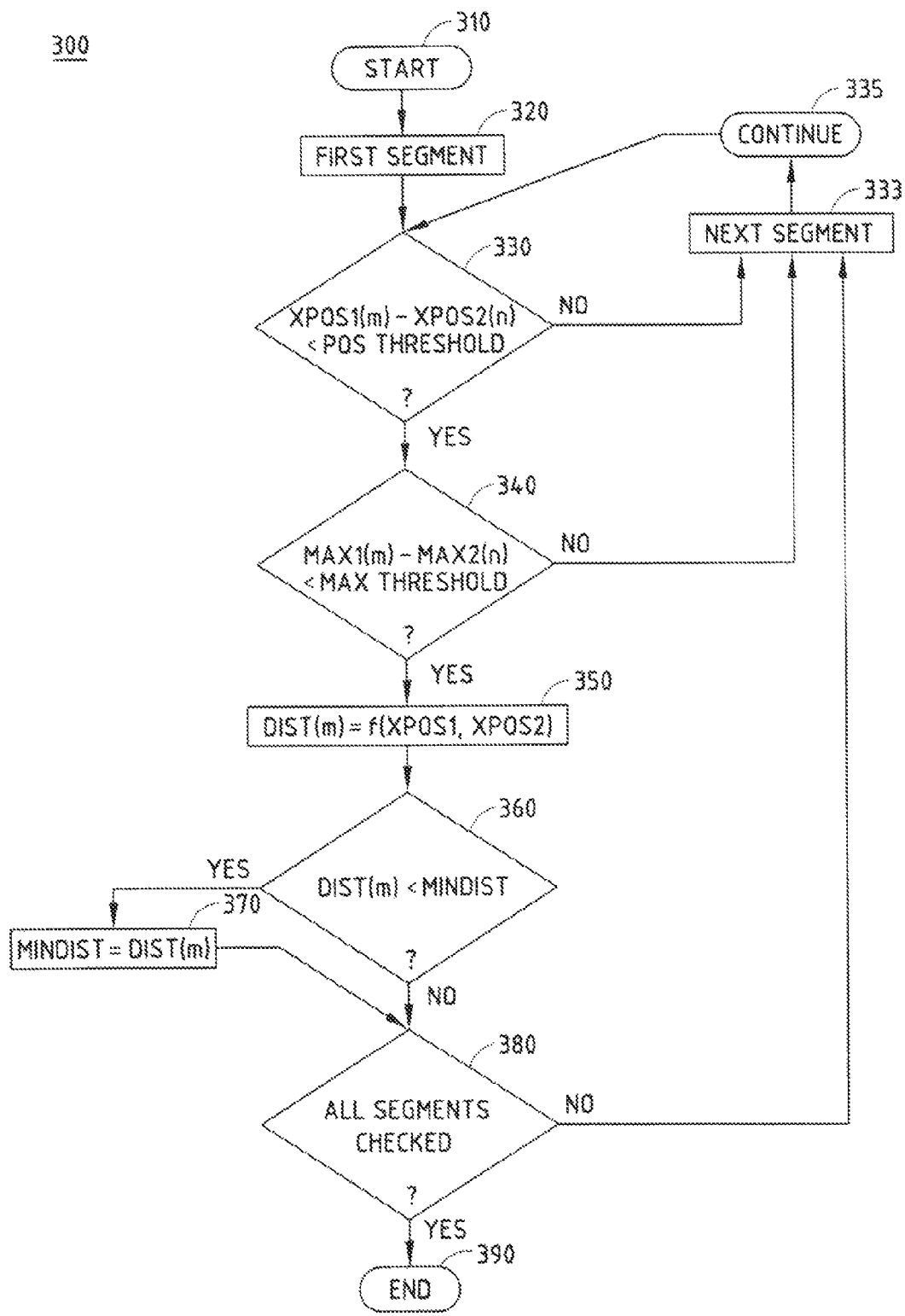
FIG. 11 is a flow-chart of a process for determining whether a particular segment on a first imaging array sensor is an image of the same object as a corresponding segment on a second imaging array sensor.

Referring now to FIG. 11, a distance algorithm or process 300 compares the average positions and intensities of each segment to corresponding segments on the other sensor 34b in order to determine whether a segment on the first sensor 34a represents the same object or light source as a corresponding segment on the second sensor 34b. Process 300 begins at 310 and selects a first segment at 320. If it is determined at 330 that an average x position and y position of the segment on the first sensor is within a predetermined position threshold of the average x position and y position of a segment on the second sensor, then it is further determined at 340 whether the maximum intensities associated with each segment on each sensor are within a maximum intensity threshold. If the average x and y positions are not within the position threshold at 330, then the process 300 moves to the next segment at 333 and continues at 335. Likewise, if the maximum intensities are not within the maximum intensity threshold at 340, the process moves to the next segment at 333 and continues at 335. If the average x and y positions are within the position threshold at 330 and the maximum intensities are within the maximum intensity threshold at 340, a distance to that object or light source is calculated at 350, preferably as a function of the x positions of the sensed light source on both sensors according to equation (1), discussed above.

Because the vehicle imaging system 12 of the present invention preferably adjusts or controls an accessory of vehicle 10 in response to the closest object or light source sensed by sensors 34a and 34b, it may also be determined at 360 whether the calculated distance is less than a lowest distance for all segments. This provides the system with the distance to the closest object or light source that has been classified by control 16. If it is determined at 360 that the distance is less than a lowest distance value, then the lowest distance value is set to the newly calculated distant value at 370. It is then determined at 380 whether all the segments have been accounted for. If it is determined at 380 that not all the segments have been accounted for, the process moves to the next segment at 333 and continues at 335. If, on the other hand, it is determined at 380 that all the segments have been accounted for, the process ends at 390. Upon completion of process 300, the least distance from the vehicle 10 to a sensed object or light source which is in a selected classification and within a position and maximum intensity threshold is stored for use by the imaging control 16. Control 16 may then function to display a distance readout or adjust the appropriate accessory of vehicle 10 in response to the intensity of the light source sensed and/or the calculated distance to that light source. Algorithms 100, 200 and 300 may then be repeated for different classifications of light sources. For example, segments may be classified as white or red light sources for headlamps or taillights or any other color which may be of interest to an operator of the vehicle.

Figure 12:
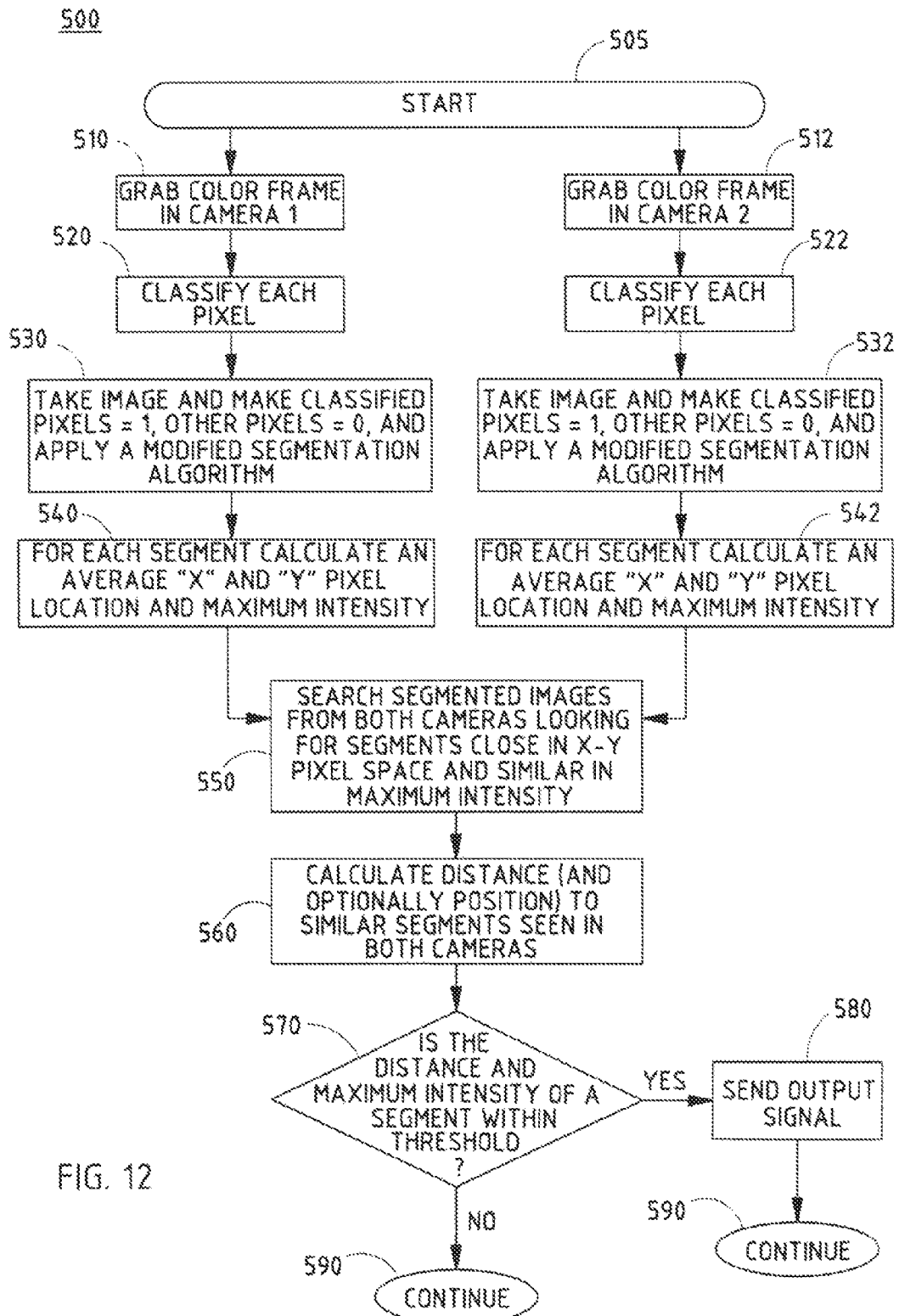
FIG. 12 is a flow-chart of the stereoscopic distance determination function of the present invention.

Referring now to FIG. 12, a process 500 is shown which calculates a distance from an imaging array sensor or sensors to an object or light source sensed by the sensors and provides an output signal in response to the distance and intensity of the light source. The output signal may be in the form of a distance display or may provide an activation signal to a control, depending on the particular application of the stereoscopic imaging process 500. Process 500 begins at 505 and grabs a color frame in each sensor or camera at 510 and 512. each pixel is then classified according to a desired color or other characteristic at 520 and 522. The classified pixels are assigned a value of one, while the remaining pixels are assigned a value of zero and a segment labeling algorithm similar to process 100 discussed above is performed at 530 and 532 for the respective sensors. Clearly, however, the classified pixels may be designated in other manners, without affecting the scope of the present invention. The average x and y pixel locations and maximum intensity of each segment are then determined at 540 and 542. Process 500 then compares the segmented images from both sensors at 550 and calculates the distance to the light source corresponding to the similar segments in both sensors at 560. The angular or lateral position of the object or light source may also be determined at 560. It may then be determined at 570 if the distance and maximum intensity of a particular segment are within a predetermined threshold. If the distance and maximum intensity are within the threshold levels, then an appropriate output signal is sent at 580 and the process continues at 590. If, on the other hand, the distance and/or maximum intensity are not within the threshold at 570, then the process may continue at 590.

Figure 13A:
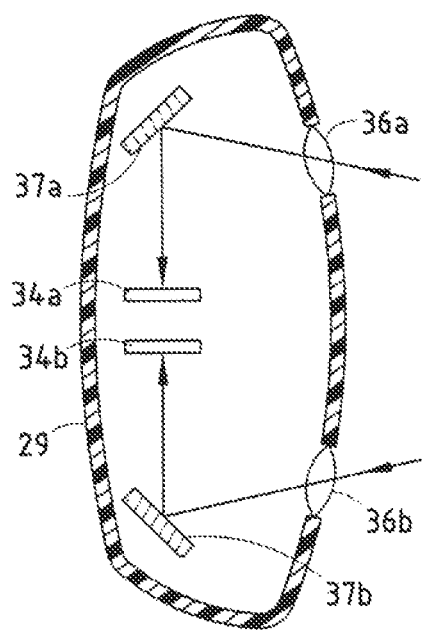
FIGS. 13A-C are schematics of various embodiments of a stereoscopic imaging sensor with distance determining capability within a housing, such as an interior rearview mirror assembly housing.
Figure 13B:
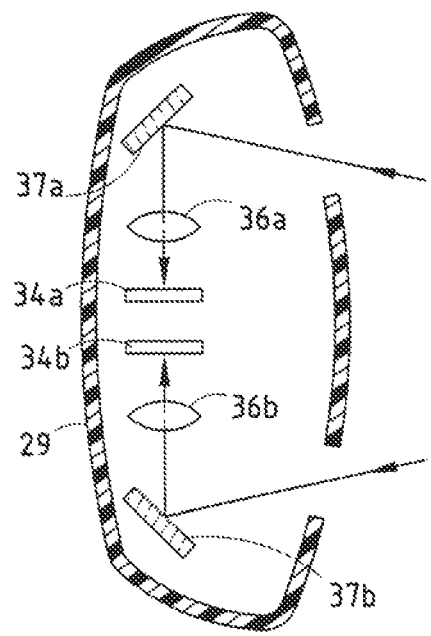
Figure 13C:
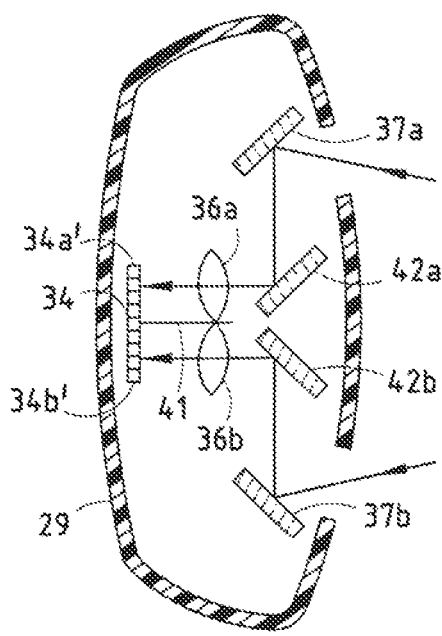

Although shown in FIG. 3 as having sensors 34a and 34b and lenses 36a and 36b positioned such that their optic paths are substantially parallel, clearly other orientations are within the scope of the present invention. For example, as shown in FIG. 13A, two oppositely facing sensors 34a and 34b may be implemented within a housing 29 or the like such that a pair of flat reflective surfaces or mirrors 37a and 37b are positioned along the respective optic paths between the lenses 36a and 36b and the sensors 34a and 34b. Alternately, a pair of openings 39a and 39b may be provided in the housing 29 to allow light to pass therethrough such that it is redirected by the flat reflective surfaces 37a and 37b toward the respective sensors 34a and 34b. The focusing lenses 36a and 36b may then be positioned along the respective optic paths between the flat reflective surfaces 37a and 37b and the sensors 34a and 34b (FIG. 13B). In another alternate orientation, a single imaging array sensor 34 may be implemented within housing 29 to receive a stereoscopic image of the scene remote from the vehicle. A divider 41 may be implemented substantially adjacent to sensor 34 to divide sensor 34 into separate and distinct sensing arrays 34a' and 34b' (FIG. 13C). An additional pair of flat reflective surfaces or mirrors 42a and 42b may also be included to redirect the image rays toward sensor 34 via focusing lenses 36a and 36b. Clearly, however, the scope of the present invention includes other orientations where the lenses and one or more reflective surfaces may be implemented along an optic path between one or more sensors and the target scene.

Although vehicle imaging system 12 is useful in various imaging system applications, the control is particularly useful with a vehicle headlamp dimming control 12' (FIGS. 14 and 15). Vehicle headlamp control 12' may then classify the pixels as red, white or black and correspondingly identify the light sources as taillights or headlamps, using the principles disclosed in commonly assigned U.S. Pat. No. 5,796,094, referenced above. Headlamp control 12' may determine the distances between vehicle 10 and the identified taillights and headlamps and communicate this information to a vehicle lighting control logic module 18 (FIG. 15). Vehicle lighting control logic module 18 may then exchange data with control 16 to control headlamps 20 of vehicle 10 in response to the output of sensor module 14 as received by imaging control 16. Imaging control 16 may analyze detected light sources to determine a color and/or intensity of the light sources and to determine a distance between the light sources and vehicle 10. This information may then be communicated to lighting control logic module 18 for dimming of headlamps 20. Dimmer control 12' thus may correspondingly control the headlamps 20 in response to the color or intensity of the light sources as well as the distance to the light sources. Additional criteria may also be considered, such as the lateral position of the sensed light sources with respect to the vehicle or other criteria associated with size, color, position, intensity or rate of approach of the light source.

Preferably, as shown in FIG. 14, imaging sensor module 14 may be fixedly mounted in housing 28 by a bracket 24 mounted to, or near, the vehicle's windshield 26. Sensor module 14 may be mounted within housing 28 in various orientations, as discussed above with respect to FIGS. 13A-13C. Bracket 24 may also mount an interior rear-view mirror 30. However, imaging sensor module 14 may be mounted elsewhere on the vehicle without affecting the scope of the present invention.

Figure 16A:
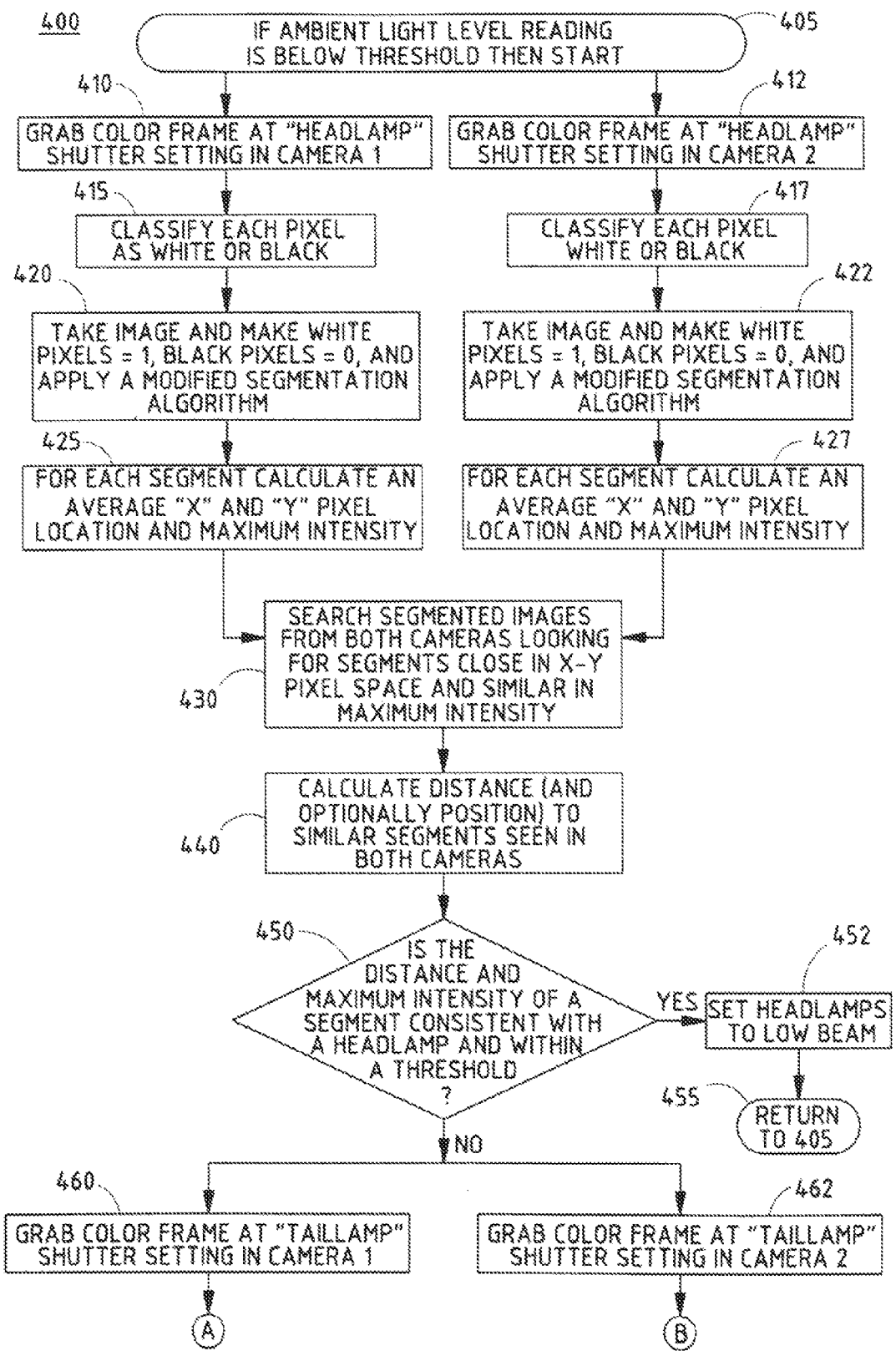
FIGS. 16A and 16B are flow-charts of the stereoscopic headlamp control processes in accordance with the present invention.
Figure 16B:
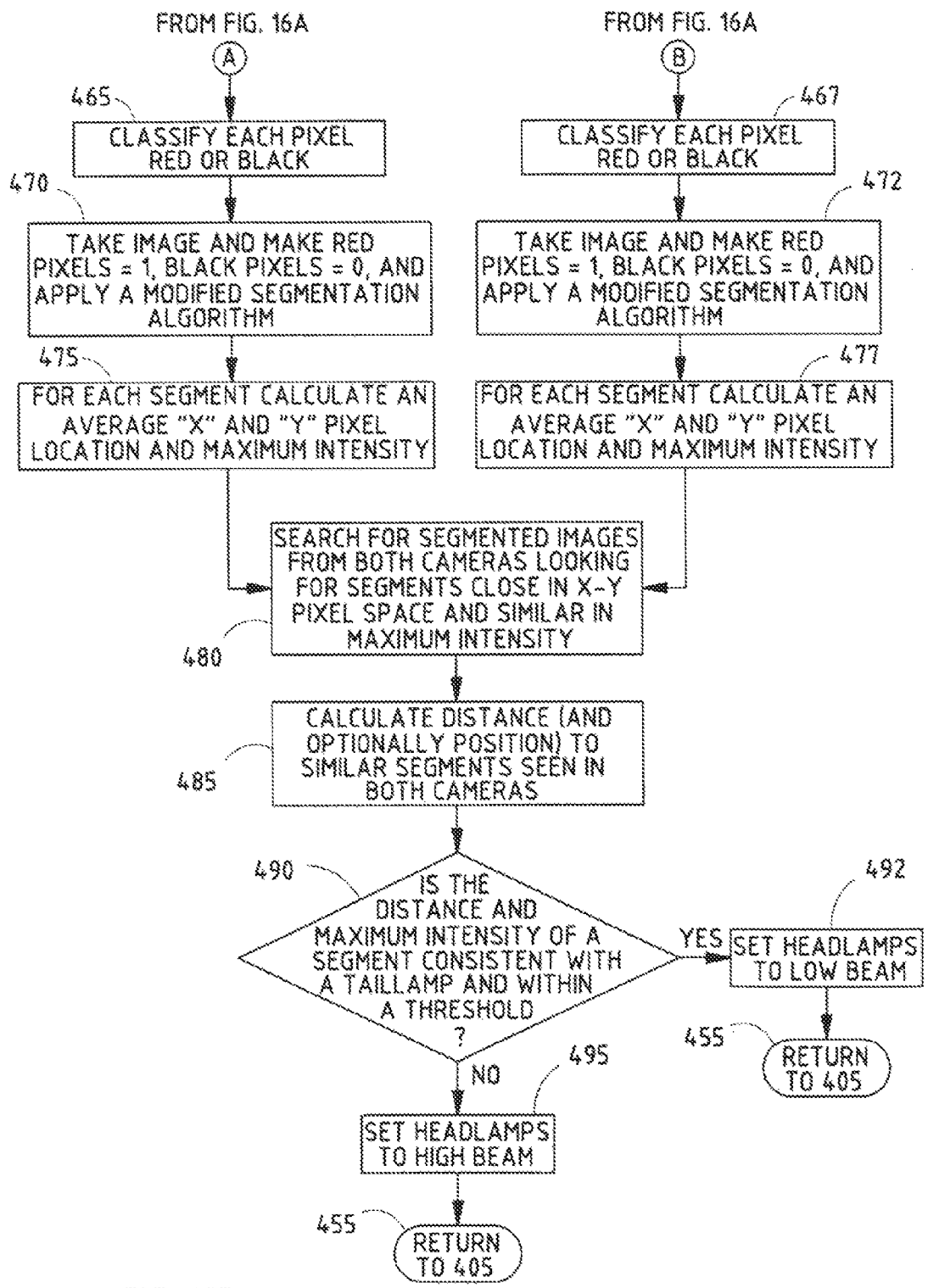

Referring now to FIGS. 16A and 16B, a headlamp control process 400 is shown which starts at 405 by determining whether the ambient light level is below a predetermined threshold. If the light level is below the threshold, then process 400 grabs a color frame at a headlamp shutter setting for both cameras or sensors 34a and 34b at 410 and 412, respectively. Process 400 then classifies each pixel as white or black at 415 and 417 and assigns a value of one to white pixels and a value of zero to black pixels at 420 and 422 or otherwise designates the pixels. The segment labeling algorithm 100 is performed at 420 and 422 for the two sensors 34a and 34b, respectively. An average x and y pixel location and maximum intensity is then calculated according to process 200 at 425 and 427 for each segment on the respective sensors. Headlamp control process 400 then compares the location and intensity of the segmented images from both sensors at 430 in order to determine segments on each sensor which correspond to a particular light source. Control process 400 determines that the segments correspond to a particular light source if the compared segments on both sensors are within an x-y pixel space threshold and intensity threshold, in accordance with process 300, discussed above. The distance to the light source corresponding to the similar segments is then calculated at 440. The angular and/or lateral position of the light source relative to vehicle 10 may also be calculated at 440. It is then determined at 450 whether the distance and maximum intensity of corresponding segments are consistent with a headlamp of an oncoming vehicle and within a predetermined threshold level. The consistency criteria may include a forward and lateral position relative to vehicle 10, intensity, size, or any other criteria which may discern a headlamp form other light sources, such as rate of approach or the like relative to vehicle 10. If it is determined at 450 that the distance, intensity and/or any other selected criteria are within the threshold levels, the headlamps are set to a low beam setting at 452 and the process returns at 455.

If it is determined at 450 that the distance, maximum intensity or other characteristics of the segment are not consistent with a headlamp or within the threshold level, then process 400 grabs color frames at a taillamp shutter setting in camera sensors 34a and 34b at 460 and 462, respectively, using the principles disclosed in U.S. Pat. No. 5,796,094, referenced above. Each pixel is then classified as red or black at 465 and 467. The red pixels are then assigned a value of one or otherwise designated, while the black pixels are assigned a value of zero or otherwise designated, at 470 and 472. The segment labeling algorithm 100 is again performed on each of the respective sensors at 470 and 472. An average x and y pixel location and maximum intensity are then calculated according to process 200 at 475 and 477 for each segment on the respective sensors. The segmented images from both cameras are then compared at 480 to determine which segments are close in x-y pixel positioning and similar in maximum intensity between the two sensors. The distance to a light source corresponding to the similar segments in both sensors is then calculated at 485. The lateral position of the light sources may also be determined at 485. It is then determined at 490 if the distance and maximum intensity of the segment are consistent with a taillamp and within a predetermined threshold. Similar to the consistency criteria above with respect to headlamps, the light source may be analyzed to determine if their size, intensity, lateral and vertical position relative to vehicle 10 and/or rate of approach to vehicle 10 are consistent with known or assumed values associated with vehicle taillights. If the distance, maximum intensity and the like are within the threshold levels, the headlamps are set to a low beam at 492 and the process returns to 405 at 455. If, on the other hand, the distance, maximum intensity and/or other selected criteria are not consistent with taillamps or are not within the threshold levels, the headlamps are set to a high beam setting at 495 and the process again returns at 455. Process 400 thus adjusts the headlamp setting in response to the distance and maximum intensity of light sources sensed by both of the sensors 34a and 34b.

Figure 17A:
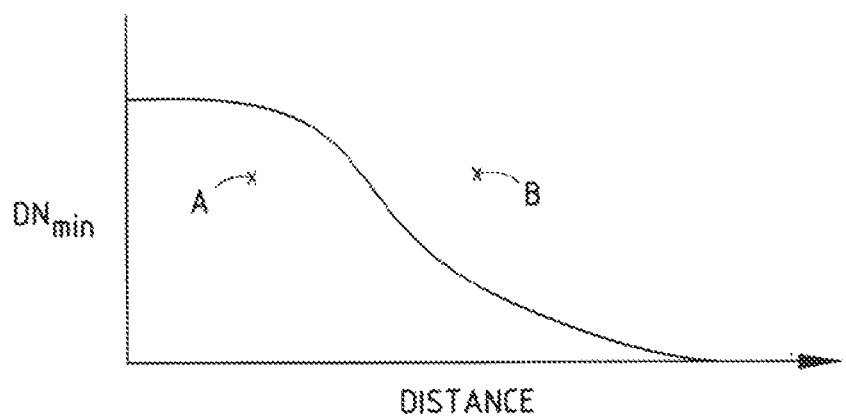
FIGS. 17A-C are curves of segment intensity versus distance useful in determining whether to activate or deactivate the high or low beams of the headlamps.
Figure 17B:
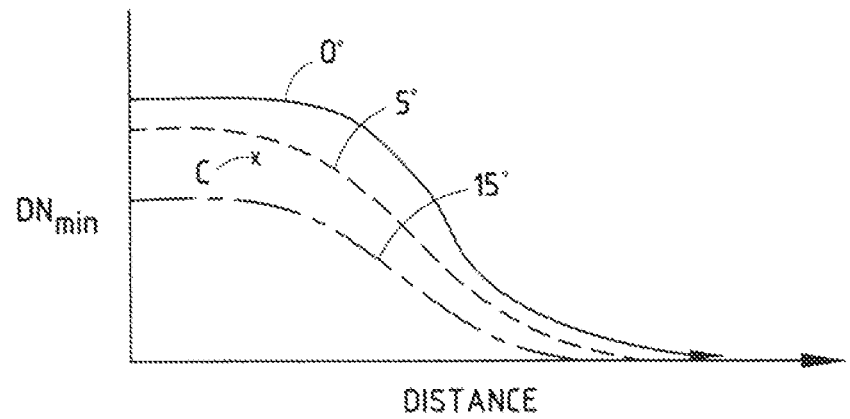
Figure 17C:
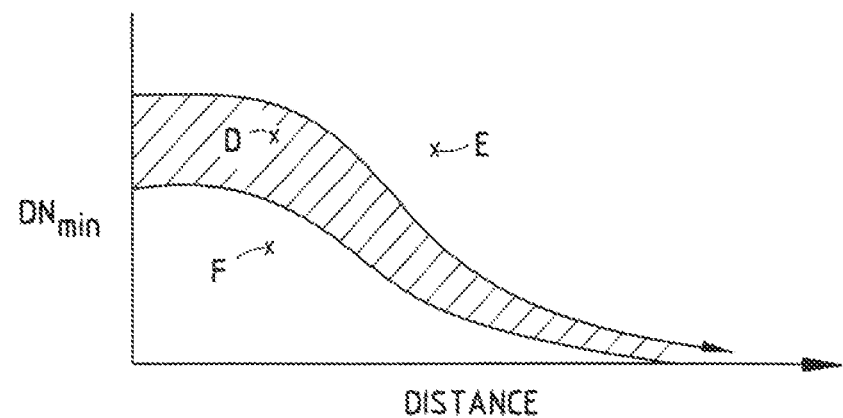

The present invention thus accounts for both the intensity of light sensed by the sensors and the distance to the light source from the vehicle 10, before adjusting the headlamp setting for the vehicle. This allows the vehicle headlamps to remain in a high beam setting until vehicle 10 is within a predetermined range of a sensed headlamp or taillight, and conversely, the headlamps may be set to a high beam setting once a sensed headlamp or taillight moves beyond that predetermined range. By sampling real world data or simulating various driving conditions, a pixel intensity versus distance curve may be created which is typical of headlamps and taillamps for various driving conditions. Such a curve is shown in FIG. 17A, where a segment intensity and corresponding distance at point A below the curve would not be classified as a headlamp, while a signal B, which has similar intensity but greater distance than point A, may be classified as a headlamp. Headlamp control process 400 is then further optimized since certain segments which are not within a range of the real world data curve would not be included in the headlamp analysis. Similarly, as shown in FIG. 17B, real world data may be used to modify the curve such that an angular position of the light source relative to vehicle 10 is further included in the analysis in order determine whether or not the segment should be classified as a headlamp or taillight. For example, the signal C in FIG. 17B would be classified as a headlamp if it is determined to be at approximately a 15° angle relative to vehicle 10, but may not be classified as a headlamp if it is only approximately 0°-5° off of the axis of the sensors 34a and 34b in vehicle 10. The system may be otherwise optimized as shown if FIG. 17C, where a minimum and maximum pixel intensity band 60 versus distance is implemented. With such a band, segments which fall within the shaded area or band 60, such as point D, may be classified as headlamps, while segments falling outside of the band 60, such as points E and F, may not be classified as headlamps by headlamp control process 400. Clearly, the scope of the present invention further includes other thresholds and criteria for determining whether a particular segment should be classified as a headlamp or taillight, with respect to its intensity and distance and/or angle or lateral position relative to vehicle 10.

Therefore, the present invention provides a stereoscopic imaging system useful with various accessory controls or displays which is operable to determine a distance from one or more imaging array sensors to an object or light source remote from the sensors. The stereoscopic imaging system may determine a distance to any object or light source in a targeted scene, without requiring additional equipment or ranging devices. Furthermore, the system may provide a distance determination to a headlamp control, without having to assume that the light source is within a predetermined range of intensities corresponding to a typical intensity of a headlamp or taillight and calculating the distance based on the intensity alone. Accordingly, the imaging system provides a more accurate distance calculation, since it is not affected by variations in the intensity of the light source that is being sensed. The accuracy of the distance calculations may be further enhanced by implementing a segmentation algorithm which determines the average position of the light source as received by the sensor, thereby facilitating sub-pixel resolution for the distance calculations. Furthermore, the distance calculation may be applied equally as well to other images that are not associated with headlamps or taillights of other vehicles. Accordingly, the stereoscopic imaging system described herein may be useful with other vehicular imaging systems, such as rearview vision systems, backup aids, rain sensors or the like.

Changes and modifications in the specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as follows:

1. A vision system for a vehicle, said vision system comprising:
   at least one imaging sensor having a forward field of view with respect to a forward direction of travel of a vehicle equipped with said vision system, wherein said at least one imaging sensor comprises a lens and a CMOS imaging array comprising a two-dimensional array of photosensing elements, and wherein said at least one imaging sensor captures image data representative of objects present in said forward field of view;
   at least one register operable to access photosensing elements of said array of photosensing elements;
   wherein said array of photosensing elements comprises a plurality of sub-arrays, said sub-arrays each having at least three neighboring photosensing elements;
   wherein at least one photosensing element of each sub-array comprises a red light sensitive photosensing element and at least one other photosensing element of each sub-array comprises a white light sensitive photosensing element;
   a control responsive to said at least one imaging sensor;
   wherein said control processes image data captured by said at least one imaging sensor to determine an object present in said forward field of view;
   wherein said control processes image data captured by said at least one imaging sensor to determine a distance between the equipped vehicle and the object determined present in said forward field of view; and
   wherein said control discerns if the determined object is an oncoming vehicle or a leading vehicle at least in part in response to rate of approach of the determined object to the equipped vehicle.

2. The vision system of claim 1, wherein said control is operable to adjust a light beam emitted by at least one headlamp of the equipped vehicle responsive to said processing of image data captured by said at least one imaging sensor.

3. The vision system of claim 1, wherein said array of photosensing elements comprises at least 512 rows of photosensing elements and at least 512 columns of photosensing elements.

4. The vision system of claim 1, wherein said array of photosensing elements comprises at least 262,144 photosensing elements.

5. The vision system of claim 1, wherein the object determined present in said forward field of view comprises a headlight or a taillight of another vehicle and wherein said control is operable to adjust a light beam emitted by at least one headlamp of the equipped vehicle responsive to said processing of said image data.

6. The vision system of claim 1, wherein said control processes image data captured by said at least one imaging sensor to identify a headlamp or taillight of another vehicle present in said forward field of view.

7. The vision system of claim 6, wherein said control processes image data captured by said at least one imaging sensor and determines a distance between the equipped vehicle and the other vehicle.

8. The vision system of claim 7, wherein said control determines the distance between the equipped vehicle and the other vehicle at least in part in response to at least one of (i) size of the determined headlamp or taillight, (ii) position of the determined headlamp or taillight, (iii) light intensity of the determined headlamp or taillight, and (iv) rate of approach of the determined headlamp or taillight.

9. The vision system of claim 1, wherein red filtering is used with at least some of said photosensing elements, and wherein, responsive at least to processing of image data captured by said red filtered photosensing elements, said control is operable to at least partially distinguish the object from other objects present in said forward field of view.

10. The vision system of claim 9, wherein, responsive at least in part to processing of image data captured by said red filtered photosensing elements, said control is operable to distinguish taillights of other vehicles ahead of the equipped vehicle.

11. The vision system of claim 1, wherein said control adjusts a light beam emitted by at least one headlamp of the equipped vehicle responsive to said control (i) processing image data captured by said at least one imaging sensor and (ii) identifying a headlamp or taillight of another vehicle present in said forward field of view.

12. The vision system of claim 11, wherein said control adjusts the light beam emitted by the at least one headlamp of the equipped vehicle by adjusting the at least one headlamp between a first beam and a second beam.

13. The vision system of claim 12, wherein said first beam comprises a lower beam and said second beam comprises a higher beam.

14. The vision system of claim 1, wherein said control is operable to control a system of the equipped vehicle responsive to said processing of image data captured by said at least one imaging sensor.

15. The vision system of claim 14, wherein said controlled system comprises at least one of (i) a lighting system of the equipped vehicle, (ii) a brake system of the equipped vehicle and (iii) a driver assistance system of the equipped vehicle.

16. The vision system of claim 1, wherein said control controls a brake system of the equipped vehicle responsive to determining that the object determined present in said forward field of view is within a threshold distance of the equipped vehicle.

17. The vision system of claim 1, wherein said at least one imaging sensor is disposed behind a windshield of the equipped vehicle and said at least one imaging sensor views through the windshield of the equipped vehicle.

18. The vision system of claim 1, wherein said at least one imaging sensor comprises at least a first imaging sensor and a second imaging sensor, and wherein said first imaging sensor is spaced from said second imaging sensor.

19. The vision system of claim 18, wherein said first and second imaging sensors comprise imaging sensors of a stereoscopic imaging system of the equipped vehicle.

20. A vision system for a vehicle, said vision system comprising:

at least one imaging sensor having a forward field of view with respect to a forward direction of travel of a vehicle equipped with said vision system, wherein said at least one imaging sensor comprises a lens and a CMOS imaging array comprising a two-dimensional array of photosensing elements, and wherein said at least one imaging sensor captures image data representative of objects present in said forward field of view;

at least one register operable to access photosensing elements of said array of photosensing elements;

wherein said array of photosensing elements comprises a plurality of sub-arrays, said sub-arrays each having at least three neighboring photosensing elements;

wherein at least one photosensing element of each sub-array comprises a red light sensitive photosensing element and at least one other photosensing element of each sub-array comprises a white light sensitive photosensing element;

a control responsive to said at least one imaging sensor;

wherein said control processes image data captured by said at least one imaging sensor to determine a headlamp or taillight of another vehicle present in said forward field of view;

wherein said control processes image data captured by said at least one imaging sensor to determine a distance between the equipped vehicle and the other vehicle; and wherein said control discerns if the other vehicle is an oncoming vehicle or a leading vehicle at least in part in response to rate of approach of the determined headlamp or taillight to the equipped vehicle.

21. The vision system of claim 20, wherein said control is operable to adjust a light beam emitted by at least one headlamp of the equipped vehicle responsive to said processing of image data captured by said at least one imaging sensor.

22. The vision system of claim 20, wherein said array of photosensing elements comprises at least 262,144 photosensing elements.

23. The vision system of claim 20, wherein red filtering is used with at least some of said photosensing elements, and wherein, responsive at least to processing of image data captured by said red filtered photosensing elements, said control is operable to at least partially distinguish the headlamp or taillight of the other vehicle from other objects present in said forward field of view.

24. A vision system for a vehicle, said vision system comprising:

at least one imaging sensor having a forward field of view with respect to a forward direction of travel of a vehicle equipped with said vision system, wherein said at least one imaging sensor comprises a lens and a CMOS imaging array comprising a two-dimensional array of at least 262,144 photosensing elements, and wherein said at least one imaging sensor captures image data representative of objects present in said forward field of view;

at least one register operable to access photosensing elements of said array of photosensing elements;

wherein said array of photosensing elements comprises a plurality of sub-arrays, said sub-arrays each having at least three neighboring photosensing element;

wherein at least one photosensing element of each sub-array comprises a red light sensitive photosensing element and at least one other photosensing element of each sub-array comprises a white light sensitive photosensing element;

a control responsive to said at least one imaging sensor;

wherein said control processes image data captured by said at least one imaging sensor to determine a headlamp or taillight of another vehicle present in said forward field of view;

wherein said control processes image data captured by said at least one imaging sensor to determine a distance between the equipped vehicle and the other vehicle;

wherein red filtering is used with at least some of said photosensing elements, and wherein, responsive at least to processing of image data captured by said red filtered photosensing elements, said control is operable to at least partially distinguish the determined headlamp or taillight of the other vehicle from other objects present in said forward field of view; and wherein said control discerns if the other is an oncoming vehicle or a leading vehicle at least in part in response to rate of approach of the determined headlamp or taillight to the equipped vehicle.

25. The vision system of claim 24, wherein said control is operable to adjust a light beam emitted by at least one headlamp of the equipped vehicle responsive to said processing of image data captured by said at least one imaging sensor.

26. A vision system for a vehicle, said vision system comprising:

at least one imaging sensor having a forward field of view with respect to a forward direction of travel of a vehicle equipped with said vision system, wherein said at least one imaging sensor comprises a lens and a CMOS imaging array comprising a two-dimensional array of photosensing elements, and wherein said at least one imaging sensor captures image data representative of objects present in said forward field of view;

at least one register operable to access photosensing elements of said array of photosensing elements;

wherein said array of photosensing elements comprises a plurality of sub-arrays, said sub-arrays each having at least three neighboring photosensing elements;

wherein at least one photosensing element of each sub-array comprises a red light sensitive photosensing element and at least one other photosensing element of each sub-array comprises a white light sensitive photosensing element;

wherein said at least one imaging sensor is disposed behind a windshield of the equipped vehicle and said at least one imaging sensor views through the windshield of the equipped vehicle;

a control responsive to said at least one imaging sensor;

wherein said control processes image data captured by said at least one imaging sensor to determine a headlamp or taillight of another vehicle present in said forward field of view;

wherein said control processes image data captured by said at least one imaging sensor to determine a distance between the equipped vehicle and the other vehicle; and wherein said control discerns if the determined object is an oncoming vehicle or a leading vehicle at least in part in response to rate of approach of the determined headlamp or taillight to the equipped vehicle.

27. The vision system of claim 26, wherein said array of photosensing elements comprises at least 262,144 photosensing elements.

28. The vision system of claim 26, wherein said control is operable to adjust a light beam emitted by at least one headlamp of the equipped vehicle responsive to said processing of said image data.

29. The vision system of claim 26, wherein red filtering is used with at least some of said photosensing elements, and wherein, responsive at least to processing of image data captured by said red filtered photosensing elements, said control is operable to at least partially distinguish the object from other objects present in said forward field of view.

30. The vision system of claim 29, wherein, responsive at least in part to processing of image data captured by said red filtered photosensing elements, said control is operable to distinguish taillights of other vehicles ahead of the equipped vehicle.

31. The vision system of claim 26, wherein said control adjusts a light beam emitted by at least one headlamp of the equipped vehicle responsive to said control (i) processing image data captured by said at least one imaging sensor and (ii) identifying a headlamp or taillight of another vehicle present in said forward field of view.

32. The vision system of claim 26, wherein said control is operable to control a system of the equipped vehicle responsive to said processing of image data captured by said at least one imaging sensor, and wherein said controlled system comprises at least one of (i) a lighting system of the equipped vehicle, (ii) a brake system of the equipped vehicle and (iii) a driver assistance system of the equipped vehicle.

* * * * *

UNITED STATES PATENT AND TRADEMARK OFFICE
CERTIFICATE OF CORRECTION

PATENT NO. : 8,629,768 B2
APPLICATION NO. : 13/525767
DATED : January 14, 2014
INVENTOR(S) : Brent J. Bos and Kenneth Schofield It is certified that error appears in the above-identified patent and that said Letters Patent is hereby corrected as shown below:

In the Specification

Column 6
Line 59, "A" should be --$\Delta$--

Signed and Sealed this
Twenty-fourth Day of April, 2018

Andrei Iancu
*Director of the United States Patent and Trademark Office*